(12) United States Patent
Fielding et al.

(10) Patent No.: US 10,726,519 B2
(45) Date of Patent: Jul. 28, 2020

(54) CACHE ARRANGEMENT FOR GRAPHICS PROCESSING SYSTEMS

(71) Applicant: Arm Limited, Cambridge (GB)

(72) Inventors: Edvard Fielding, Trondheim (NO); Jakob Axel Fries, Malmo (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/714,037

(22) Filed: Sep. 25, 2017

(65) Prior Publication Data

US 2019/0096027 A1 Mar. 28, 2019

(51) Int. Cl.
| | |
|---|---|
| *G06T 1/60* | (2006.01) |
| *G06T 1/20* | (2006.01) |
| *G06T 15/00* | (2011.01) |
| *G06F 12/0811* | (2016.01) |
| *G06T 15/04* | (2011.01) |

(52) U.S. Cl.
CPC ............ *G06T 1/60* (2013.01); *G06F 12/0811* (2013.01); *G06T 1/20* (2013.01); *G06T 15/005* (2013.01); *G06T 15/04* (2013.01); *G06F 2212/455* (2013.01); *G06F 2212/60* (2013.01); *G06F 2212/62* (2013.01)

(58) Field of Classification Search
CPC . G06T 1/60; G06T 1/20; G06T 15/005; G06F 12/0811; G06F 2212/455; G06F 2212/60; G06F 2212/62
See application file for complete search history.

(56) References Cited

U.S. PATENT DOCUMENTS

| | | | |
|---|---|---|---|
| 6,181,350 B1 | 1/2001 | Corona | |
| 6,483,516 B1 * | 11/2002 | Tischler | G06F 12/0811 345/537 |
| 6,518,974 B2 | 2/2003 | Taylor | |
| 7,171,051 B1 | 1/2007 | Moreton | |
| 8,271,734 B1 * | 9/2012 | Glasco | G06F 12/084 345/546 |
| 8,411,753 B2 | 4/2013 | Cha | |
| 8,447,948 B1 * | 5/2013 | Erdogan | G06F 12/0871 711/129 |
| 2003/0151610 A1 | 8/2003 | Kuriakin | |

(Continued)

OTHER PUBLICATIONS

Zhang et al, Enabling Partial Cache Line Prefetching Through Data Compression, URL: www.cs.ucr.edu/~gupta/research/Publications/Comp/icpp03.pdf (Year: 2003).*

(Continued)

*Primary Examiner* — Phuc N Doan
(74) *Attorney, Agent, or Firm* — Vierra Magen Marcus LLP

(57) ABSTRACT

A graphics processing system includes a cache system for transferring texture data stored in memory to a graphics processing unit for use by the graphics processing unit when generating a render output. The cache system includes a first cache operable to receive texture data from the memory system, and a second cache operable to receive texture data from the first cache and to provide texture data to the graphics processing unit for use when generating a render output, and a data processing unit intermediate the first cache and the second cache and operable to process data stored in the first cache and to store the processed data in the second cache.

16 Claims, 15 Drawing Sheets

(56) References Cited

U.S. PATENT DOCUMENTS

| | | | | |
|---|---|---|---|---|
| 2007/0252843 | A1* | 11/2007 | Yu | G06T 15/005 345/557 |
| 2009/0160857 | A1* | 6/2009 | Rasmusson | G06T 11/001 345/422 |
| 2010/0161904 | A1* | 6/2010 | Cypher | G06F 12/0811 711/122 |
| 2014/0122809 | A1 | 5/2014 | Robertson | |
| 2014/0140401 | A1 | 5/2014 | Lee | |
| 2014/0156948 | A1* | 6/2014 | Roberts | G06F 12/0895 711/143 |
| 2015/0169459 | A1* | 6/2015 | Huang | G06F 12/0864 711/128 |
| 2015/0178214 | A1* | 6/2015 | Alameldeen | G06F 12/0875 711/125 |
| 2016/0048980 | A1* | 2/2016 | Wang | G06T 11/40 345/583 |
| 2017/0255562 | A1* | 9/2017 | Usui | G06F 12/0895 |
| 2017/0256024 | A1* | 9/2017 | Abraham | G06T 15/04 |
| 2017/0262373 | A1* | 9/2017 | Bedi | G06F 17/30902 |
| 2017/0286302 | A1* | 10/2017 | Roy | G06F 12/0831 |
| 2017/0293561 | A1* | 10/2017 | Dwiel | G06F 12/0811 |
| 2017/0295379 | A1 | 10/2017 | Sun | |
| 2018/0089091 | A1* | 3/2018 | Akenine-Moller | G06T 1/60 |
| 2018/0301125 | A1* | 10/2018 | Haraden | G02B 27/0172 |

OTHER PUBLICATIONS

Fielding, et al., "Graphics Processing Systems," U.S. Appl. No. 16/029,619, filed Jul. 8, 2018.
Office Action dated Dec. 12, 2018, U.S. Appl. No. 16/029,619.
UK Patent Application No. 1711269.9, filed Jul. 13, 2017, "Graphics Processing Systems," Applicant Arm Limited.
UK Filing Receipt dated Jul. 13, 2017, UK Patent Application No. 1711269.9, filed Jul. 13, 2017, "Graphics Processing Systems," Applicant Arm Limited.
Office Action dated Mar. 12, 2019, U.S. Appl. No. 16/029,619.
Notice of Allowance dated Apr. 5, 2019, U.S. Appl. No. 16/029,619.

* cited by examiner

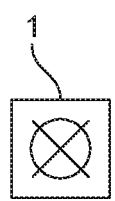
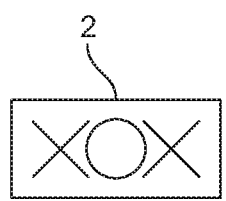
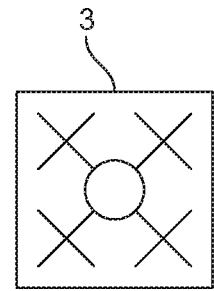
FIG. 7a   FIG. 7b   FIG. 7c
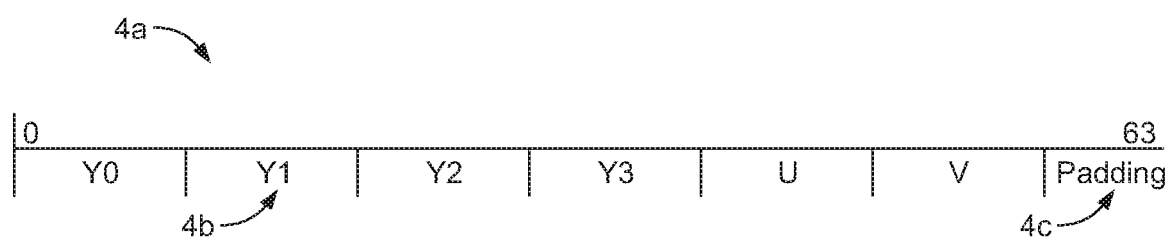
FIG. 8

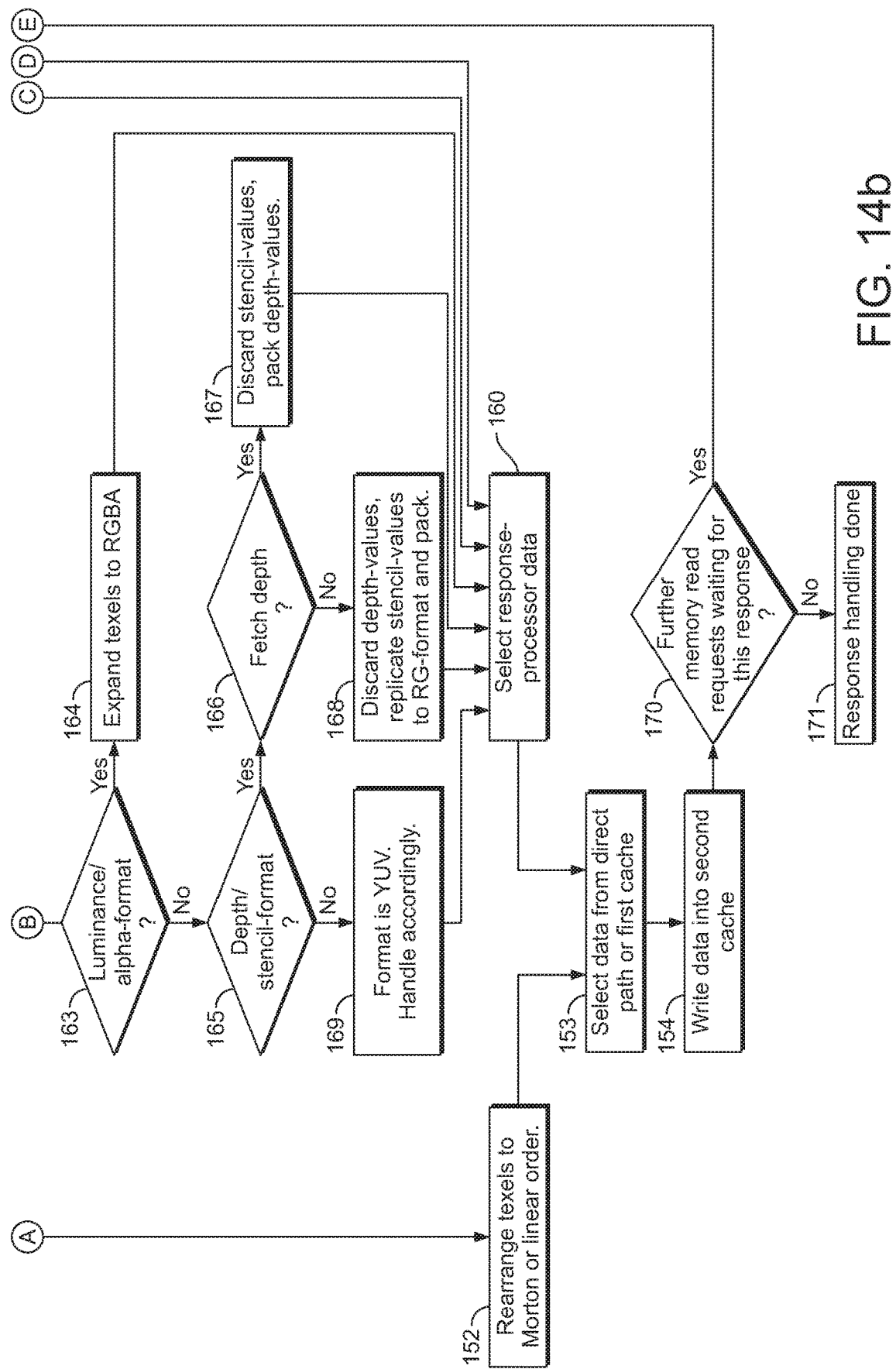

CACHE ARRANGEMENT FOR GRAPHICS PROCESSING SYSTEMS

BACKGROUND

The technology described herein relates to a method of and an apparatus for caching data in a graphics processing system, and in particular to a method of and an apparatus for storing texture data in a cache in a graphics processing system.

It is common in graphics processing systems to generate data values (e.g. colours) for sampling positions in a render output (e.g. image to be displayed) by applying so-called textures or texture data to the surfaces to be drawn. Such textures are typically applied by storing an array of texture elements or "texels", each representing given texture data (such as colour, luminance and/or light/shadow, etc., values), and then mapping the texels onto the corresponding elements, such as (and typically), a set of sampling positions, for the render output in question (e.g. image to be displayed).

Thus a graphics texture will typically be configured as an array of data elements (texture elements (texels)), each having a corresponding set of texture data stored for it. The texture data for a given position within the texture is then determined by sampling the texture at that position (e.g. by using a bilinear interpolation process).

When texture data is needed by a graphics processor (e.g. for rendering an image to be displayed), the texture data required for the rendering process is usually first fetched from the memory where it is stored and loaded into a cache (e.g. a texture cache) of or accessible to the graphics processor, with the graphics processor (the rendering pipeline implemented by the graphics processor) then reading the texture data from the cache for use.

The Applicants believe that there is scope for the improvements to the caching of texture data in graphics processing systems.

BRIEF DESCRIPTION OF THE DRAWINGS

Embodiments of the technology described herein will now be described by way of example only and with reference to the accompanying drawings, in which:

FIGS. 7(a)-(c) show examples of stored texels for YUV444, YUV422 and YUV420 chroma sub-sampling modes, respectively;

FIG. 8 shows an embodiment of how texture data from a YUV420 texel can be stored in a data word;

FIGS. 14a and 14b are flowcharts showing the transfer of data to the second cache in the cache system in an embodiment of the technology described herein;

Like numerals are used for like features in the drawings (where appropriate).

DETAILED DESCRIPTION

Figure 1:
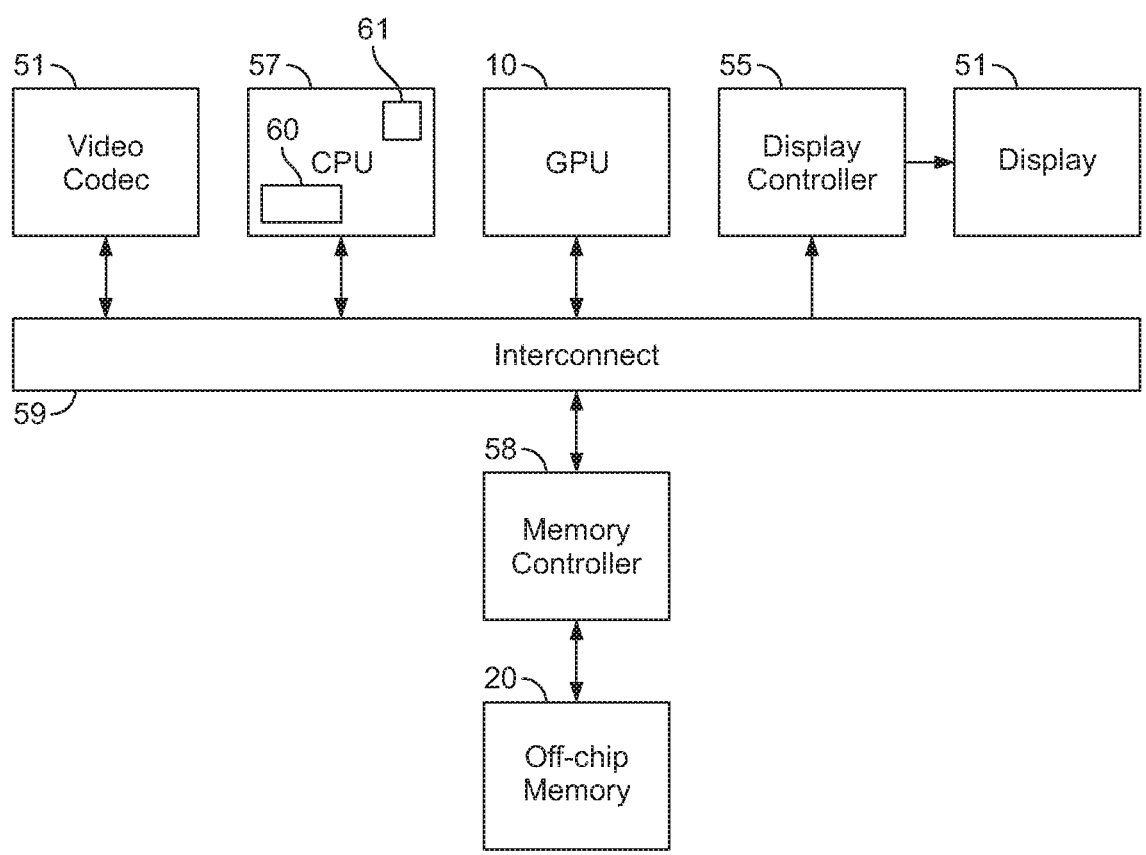
FIG. 1 shows an exemplary data processing system in which the technology described herein may be implemented.

A first embodiment of the technology described herein comprises a graphics processing system comprising:
 a memory system;
 a graphics processing unit; and
 a cache system arranged between the memory system and the graphics processing unit and operable to transfer texture data stored in the memory system to the graphics processing unit for use by the graphics processing unit when generating a render output;
  the cache system comprising:
  a first cache operable to receive texture data from the memory system;
  a second cache operable to receive texture data from the first cache and to provide texture data to the graphics processing unit for use when generating a render output; and
  a data processing unit intermediate the first cache and the second cache and operable to process data stored in the first cache and to store the processed data in the second cache for use by the graphics processing unit when generating a render output.

A second embodiment of the technology described herein comprises a method of operating a graphics processing system, the graphics processing system comprising:
 a memory system;
 a graphics processing unit; and
 a cache system arranged between the memory system and the graphics processing unit and operable to transfer texture data stored in the memory system to the graphics processing unit for use by the graphics processing unit when generating a render output;
  the cache system comprising:
  a first cache operable to receive texture data from the memory system;
  a second cache operable to receive texture data from the first cache and to provide texture data to the graphics processing unit for use when generating a render output; and
  a data processing unit intermediate the first cache and the second cache and operable to process data stored in the first cache and to store the processed data in the second cache for use by the graphics processing unit when generating a render output;

the method comprising:

loading texture data from the memory system into the first cache of the cache system;

the data processing unit processing the texture data loaded into the first cache and storing the processed data in the second cache; and the graphics processing unit using the processed texture data stored in the second cache to perform a texturing operation.

The technology described herein relates to the caching of graphics textures for use by a graphics processor (graphics processing unit). In the technology described herein, the cache system that connects to the (main) memory system of the graphics processing system and that is used to cache texture data for use by the graphics processing unit, rather than simply comprising a single cache, comprises two caches via which texture data can be transferred from the memory system to the graphics processing unit. In particular, there is a first cache that interfaces with the (main) memory system that stores the texture data, and then a second cache that interfaces between the first cache and the graphics processing unit that is to use the texture data.

The cache system of the technology described herein also includes a data processing unit that is able to process data stored in the first cache that interfaces with the memory system before that data is transferred to the second cache that interfaces with the graphics processing unit (with the graphics processor).

As will be discussed further below, the Applicants have found using such a cache system for handling texture data in a graphics processing system can provide a number of advantages. For example, using a two stage (two level) caching arrangement and a data processing unit that is able to process the texture data between the two caches (cache stages) facilitates, as will be discussed further below, the modification (e.g. decompression and/or rearrangement) of the texture data from its form and arrangement as stored in the (main) memory of the graphics processing system before it is loaded into the (second) cache that interfaces with the graphics processing unit.

The Applicants have recognised in this regard that in the case of texture data in particular, it may be desirable to modify the texture data from the form in which it is stored in the (main) memory before it is used in a texturing operation. For example, the texture data may be stored in a compressed form in main memory, but need to be converted to an uncompressed form for use in a texturing operation. It may also be that texture data needed for a given texturing operation may be stored in a "distributed" arrangement in the main memory (for example where YUV texture data is stored as separate Y, U and V planes in the main memory). In this case, the Applicants have recognised that it may be desirable to collate the distributed texture data before it is used for a texturing operation.

As will be discussed further below, the use of two caches (the two stage (two-level) caching arrangement of the technology described herein), together with an intermediate data processing unit (stage), facilitates performing such operations prior to the texture data being used in a texturing operation in a more efficient and effective manner.

The memory (memory system) of the graphics processing system that the texture data is stored in (and that the cache system of the technology described herein interfaces with) may comprise any suitable and desired memory and memory system of the graphics processing system (e.g. of the overall data processing system that the graphics processing system is part of), such as, and in an embodiment, a main memory for the graphics processing system (e.g. where there is a separate memory system for the graphics processor), or a main memory of the data processing system that is shared with other elements, such as a host processor (CPU), of the data processing system. Other arrangements would, of course, be possible.

The cache system (e.g. the first cache of the cache system) of the technology described herein may interface with and receive data from the (main) memory (and memory system) in any suitable and desired manner. It in an embodiment receives the data that is stored in the (main) memory via a cache of the (main) memory system.

In an embodiment, the cache system of the technology described herein interfaces and connects (in an embodiment directly) to the L2 cache of the main cache hierarchy of the memory system (e.g. of the graphics processing system or of the data processing system, as appropriate). In an embodiment the first cache of the cache system in the technology described herein (i.e. that interfaces and receives data from the main memory system) interfaces with the L2 cache of the main cache hierarchy of the memory system for the graphics processing system.

The first and second caches of the cache system of the technology described herein can be configured in any suitable and desired manner, and can, e.g., and in an embodiment, include any desired and suitable number of cache lines. They in an embodiment each comprise a plurality of cache lines.

The first and second caches may be the same size (e.g. in terms of their storage capacity (e.g. number of cache lines)), but in an embodiment, the second cache (the cache that interfaces with the graphics processing unit) is larger (has a greater capacity (number of cache lines) than the first cache (that interfaces with and receives data from the memory)). This can facilitate, for example, and as will be discussed further below, storing texture data that is in a compressed form in the main memory in an uncompressed form in the second cache for use by the graphics processing unit.

In an embodiment, the second cache is bigger (has a greater capacity) than the first cache by a particular, in an embodiment selected, in an embodiment predefined ratio, which ratio may be (and is in an embodiment) based on an expected or known compression ratio for the texture data (e.g. the expected or known compression ratio that the texture data will be compressed to when stored in a compressed form in the memory). In an embodiment, the second cache is twice or four times as big as the first cache.

(It will be appreciated in this regard, that having the second cache larger than the first cache is contrary to the normal arrangement in cache hierarchies where caches in the cache hierarchy become progressively smaller as the caches are further from the main memory.)

Subject to the particular features for the first and second caches that will be discussed herein, those caches can otherwise be configured and operate in any suitable and desired manner, such as, and in an embodiment, in dependence on and according to the normal cache mechanisms for the graphics (data) processing system in question. Thus they may, for example, and in an embodiment do, use normal cache operations and processes, such as least recently used (LRU) processes, to identify and free-up cache lines for use, etc., and to control the storing of texture data in the caches. Other arrangements would, of course, be possible.

The texture data can be stored in the first cache (the cache that interfaces with the (main) memory) in any suitable and desired manner and format.

In an embodiment, the texture data is stored in the first cache of the cache system in the form that it is stored in in the (main) memory. Thus the first cache in an embodiment stores a copy of the texture data (of the stored bits) that is (and as it is) stored in the (main) memory. Correspondingly, if the texture data is stored in a compressed form in the (main) memory, the texture data is in an embodiment stored in that compressed form in the first cache. Thus, in an embodiment, the texture data is stored in a compressed form in the first cache.

In an embodiment, an identifier (a "look-up" key) for identifying texture data stored in the first cache is also stored in association with (and in an embodiment in) the first cache for use to identify the texture data in the first cache (i.e. that can be and is in an embodiment used to read texture data from the first cache).

The identifier can be provided in any suitable and desired way. In an embodiment, the identifier is provided as a tag for the cache line in question (in which the texture data is stored).

In an embodiment, the texture data that is stored in the first cache is identified (tagged) using an identifier that is indicative of the memory address where the texture data is stored (in the (main) memory).

In an embodiment, the (and each) identifier used for the texture data in the first cache is indicative of the memory address where the texture data is stored. In an embodiment, each cache line of texture data in the first cache is identified (is tagged) using the memory address of at least some of the texture data (e.g. of a given byte of the texture data) that is stored in the cache line. In an embodiment the tag (identifier) comprises the memory address of the first byte of texture data in the cache line in question.

Other arrangements would, of course, be possible.

The second cache of the cache system of the technology described herein (i.e. that interfaces with, and provides texture data to, the graphics processing unit for use when generating a render output) can interface with the graphics processing unit in any suitable and desired manner.

In an embodiment, this second cache interfaces with, and connects to, the texture mapper of the graphics processing pipeline of the graphics processing unit (which texture mapper is operable to receive (load) texture data from the second cache of the cache system and use that texture data to perform texturing operations).

Thus, in an embodiment, the graphics processing unit comprises a texture mapper (texture mapping circuitry) that is operable to use data stored in (and receive data from) the second cache, and to use that data when performing and to perform a texturing operation.

The texture data can be stored in the second cache (the cache that interfaces with the graphics processing unit) in any suitable and desired manner.

In an embodiment, the texture data is stored in the second cache in an uncompressed form (e.g., and in particular, where the texture data is stored in the memory in a compressed form).

The texture data is in an embodiment stored in the second cache of the cache system in one of a number of predefined texture formats, e.g., and in an embodiment, corresponding to particular arrangements and positions for the texture data components (channels) (e.g. RGB or YUV) being used. In an embodiment, there is a set of particular, in an embodiment selected, in an embodiment predefined, texture data formats that can be used in (by) the graphics processing unit, and the texture data is stored in the second cache using one of those formats (but as will be discussed further below, the texture data does not need to be, and may not be, stored in one of the predefined formats in the first cache that interfaces with the main memory system or in the memory itself).

In an embodiment, the texture data is stored in the second cache such that all the texture data components (e.g. colour channels) for a given texel (texture data element) in the texture are stored together as a group (e.g. in a contiguous sequence of bits) in the second cache. Thus, in an embodiment, the texture data is stored in the second cache as respective "texels" (texture data elements) (irrespective of the form in which the data may be stored in the main memory system or in the first cache of the cache system of the technology described herein).

Thus, in the case of RGB (or RGBA) texture data, each of the red, green and blue (and alpha if present) data values for a given texel (texture data element) will be stored together (in a contiguous sequence of bits) in the second cache.

Correspondingly, in the case of YUV (or PUVA), texture data the data values for a chrominance data element and its associated set of one or more luminance data elements of the texture are in an embodiment stored together as a group in the second cache (i.e. the YUV texture is stored in the second cache such that a chrominance data element (data value) and its associated set of one or more luminance data elements (values) are stored together in the second cache).

The Applicants have recognised in this regard that for each chrominance data element (position) in a YUV texture, there will be a corresponding set of one or more luminance data elements (positions) (depending upon whether and which chroma sub-sampling mode is being used). In other words, the YUV texture can also effectively be considered as being made up of a plurality of "texels", with each such texel comprising one chrominance data element (one chroma sample) of the YUV texture and the set of associated one or more luminance data elements (luma samples) of the YUV texture (and having a respective position within the texture, e.g., in effect, corresponding to the position of the chrominance data element of the texel in the texture).

For example, for a YUV444 texture, each texel will comprise one chrominance data element (sample) and one luminance data element (luma sample). For a YUV422 texture, each texel will comprise one chrominance data element and a pair of luminance data elements. For YUV420, each texel will comprise one chrominance data element and four luminance data elements.

In the technology described herein, the data values (the luminance and chrominance data values) for such a texel are in an embodiment stored together as a group in the second cache.

Correspondingly, YUV texture data is in an embodiment stored in the second cache as respective groups of that data (texels), with each such group (texel) comprising the data values for one chroma data element (sample) and its associated one or more luma data elements (samples).

The data values for a given texel may be stored together as a group in the second cache in any suitable and desired manner. In an embodiment, the data values are stored as a defined data unit, such as, and in an embodiment, as a respective data word, in the second cache. Each respective group of data values for a texel could, for example, be stored as a 64-bit data word in the second cache.

In an embodiment a common data unit (e.g. data word) structure is used for each respective texel that is stored in the second cache. In an embodiment the data unit (e.g. data word) has respective fields for the data values, and each such data unit (data word) has the same order and configuration of those fields.

In an embodiment fixed-size data units (data words) are used, even if such a unit may be larger than is required for the data values. In an embodiment the data units (e.g. data words) are sized so as to be suitable for the cache and cache system (and memory system) of the graphics processing system.

In the case where the data values for a particular texel do not fill the data unit (word), any unused bits in the data unit are in an embodiment padded with "dummy" values, and/or used to encode other properties, such as transparency.

As discussed above, the second cache should, and in an embodiment does, comprise one or more, and in an embodiment a plurality of, cache lines.

In an embodiment, a plurality of groups of texture data (texels) are stored in a (and in an embodiment in each) cache line in the second cache. Correspondingly, a (and each) cache line in the second cache in an embodiment comprises a plurality of data units (data words), with each data unit containing the data for one group of texture data (texel).

A cache line can store any suitable and desired number of groups of texture data (texels). This may depend, for example, upon the size of each cache line and the size of the data units (data words) that are used to store each group of texture data (texels). For example, in the case where each cache line contains 1024-bits, and 64-bit data words are used to store the data for a texel, each cache line could, and in an embodiment does, contain up to (and in an embodiment does contain) 16 groups of texture data (texels).

Thus, in an embodiment, each cache line may, and in an embodiment does, contain 16 groups of texture data (texels).

In an embodiment, the plurality of groups of texture data (texels) stored in a cache line in the second cache comprise a set of contiguous texels of the texture (i.e. represent a set of adjacent (or successive) texture data element positions of the texture).

In other words, the plurality of groups of texture data (texels) stored in a cache line in an embodiment comprises a set of texels that cover a particular region (area) of the texture (and thus in the case of a YUV texture, a set of chroma data element positions of the texture (and their corresponding luma data element positions) for a particular region (area) of the YUV texture).

The set of contiguous texels that is stored in the cache line can have any suitable and desired configuration. In an embodiment, the set of contiguous texels is rectangular, including square. For example, a cache line can store a row or column of texels that is one texel high or wide, respectively.

In an embodiment, a cache line is used to store a set of contiguous texels that is two rows (or two columns) of texels high (or wide) (with the number of texels in the rows or columns then being determined by the overall capacity of the cache line). In another embodiment, a cache line stores a square set of contiguous texels.

Thus, in the case where each cache line contains 16 groups of texture data, those 16 groups (texels) in an embodiment comprise an 8×2, 2×8 or 4×4 set of such groups (texels) from the texture.

The groups of texture data (texels) may be stored in a cache line in any suitable and desired order. In an embodiment, they are stored in the cache line in a particular, in an embodiment selected, in an embodiment predefined order, e.g., and in an embodiment, with respect to the set of contiguous texels of the texture that they correspond to. This will then facilitate identifying respective groups of texture data (texels) within a cache line, e.g., from knowing the position of one of the groups of texture data in the cache line.

In an embodiment, the plurality of groups of texture data (texels) are stored in the cache line in an order in which they correspond to the image to be processed, e.g. in Morton (Z) order, raster order, etc.

By arranging and storing the texture data in the second cache in this way, this can facilitate later processing of the texture data for a particular area or sample position of the texture as all of the texture data for an area of the texture is stored together in a cache line.

In an embodiment, an identifier (a "look-up" key) for identifying texture data stored in the second cache is also stored in association with (and in an embodiment in) the second cache for use to identify the texture data in the second cache (i.e. that can be and is in an embodiment used to read texture data from the second cache).

The identifier can be provided in any suitable and desired way. In an embodiment, the identifier is provided as a tag for the cache line in question (in which the texture data is stored).

In an embodiment, the texture data that is stored in the second cache is identified (tagged) using an identifier that is indicative of a position in the graphics texture (that the cached texture data comes from) (in contrast to, e.g., using a memory address where the data is stored).

In an embodiment, the (and each) identifier used for the texture data in the second cache is indicative of a position in the texture. In an embodiment, each cache line of texture data in the second cache is identified (is tagged) using a position in the texture of at least some of the texture data that is stored in the cache line.

The position in the texture that is used as an identifier for texture data in the second cache can be any suitable and desired position in the texture. In an embodiment, the identifier is indicative of the position in the graphics texture of a texel or set of plural texels of the texture.

The position need not be the position of the group of texture data (texel) in question (and, indeed, in an embodiment typically will not be, as will be discussed further below), but should be a position from which the position of the group of texture data (texel) in question in the texture can be determined.

In an embodiment, the identifier is indicative of a region within the texture (that the texel (group of texture data) falls within (belongs to)).

While it would be possible to provide a separate identifier for each group of texture data (texel), in an embodiment, a single (one) identifier (tag) is provided and used for more than one group of texture data (texel). In an embodiment, a single "position" identifier (tag) is provided and used for a given cache line in the second cache (and thus used in common for the plurality of groups of texture data (texels) stored in the cache line).

In such an embodiment, where a single "position" identifier (tag) is provided and used for a given cache line, the single "position" identifier (tag) that is provided and used for a given cache line is indicative of the position of the plural groups of texture data (texels) (the set of contiguous texels) that is stored in the cache line in question.

In an embodiment, the overall texture is considered to be divided into respective regions (chunks). Each such region is in an embodiment the same size and shape (configuration), and in an embodiment contains the same number (and layout) of texels. Each region in an embodiment corresponds to a given group of texels (block of texels) that will be stored in (that will fill) a cache line.

In this case, the respective regions (chunks) that the texture is divided into are in an embodiment indexed across the texture, and the position identifier (tag) used for a given cache line of the second cache is then set to the index position (coordinates) of the texture data region within the texture that the plural texels (set of texels) that are stored in the cache line corresponds to. The position identifier (e.g. cache line tag) in an embodiment thus indicates one of the texture regions (chunks).

Thus, in an embodiment, the texture that is being stored in the cache system is divided into a plurality of regions (chunks), each region corresponding to a set of plural texels that will be stored in a single cache line in the second cache, and the position identifiers (tags) that are used for the cache lines in the second cache are indicative of the relative position within the texture of the texture region (chunk) that the set of texels stored in the cache line corresponds to.

Other arrangements would, of course, be possible.

For example, the identifier (tag) for a cache line could (and in an embodiment does) indicate the position of one (e.g. the first) of the texture data groups (texels) stored in the cache line, and/or of a data element of one (e.g. the first) of the texture data groups (texels) stored in the cache line. For example, in the case of a YUV texture the identifier for a cache line may indicate the position of the chroma data element in a, e.g. the first, texture data group (texel) stored in the cache line.

The identifier indicative of position in the texture can be configured in any suitable and desired form. Thus it could, for example, comprise an "absolute" position in the texture. However, in an embodiment, the identifier indicates the position as a position index, e.g., and in an embodiment, as discussed above by indicating the (relative) position index (coordinates) (x and y indices) of the set of texels stored in the cache line. Alternatively, the identifier may indicate the position as a position index, e.g., and in an embodiment, by indicating the index of the texel in question that the position corresponds to.

In the former case, the position index could indicate the position of the region (set of texels) in the texture, with the index (0,0) (e.g.) indicating the top left region (chunk), (1,0) indicating the next region (chunk) along horizontally, and (0,1) indicating the next region (chunk) below the region (chunk) at (0,0). Thus, the indices would run from (0,0) to (x-1, y-1), where x is the number of texture regions (chunks) horizontally and y is the number of texture regions (chunks) vertically, and the index (x-1, y-1) would indicate the bottom right region (chunk) in the texture.

Correspondingly, in the latter case the position index could indicate the position of the texel in the array of texels in the texture, with the index (0,0) indicating the top left texel, (1,0) indicating the next texel along horizontally, and (0,1) indicating the next texel below the texel at (0,0). Thus, the indices would run from (0,0) to (x-1, y-1), where x is the number of texels horizontally and y is the number of texels vertically, and the index (x-1, y-1) would indicate the bottom right texel in the texture.

It will be appreciated from the above, that in its embodiments at least, the texture data is stored in the second cache such that the data values for a given texel are stored together as a group in the second cache, and identified in the second cache by means of an identifier that is indicative of a position in the graphics texture.

The effect of this then is that, as will be discussed further below, the texture data in the second cache can be accessed in (and requested from) the second cache for use directly based on the texture position that is required (rather than, e.g., having to convert that position to appropriate memory addresses where the texture data may be stored). Furthermore, the data values for a given texture position may be read together from the second cache, based on (e.g. using) the texture position that is required (that is to be sampled).

Thus, in an embodiment, a (and each) cache line in the second cache is associated with (tagged with) an indication of the position within the texture of the texture data that is stored in the cache line. The position could, as discussed above, simply comprise a 2D position (x, y coordinate), but it could also where appropriate include a vertical position (z coordinate), e.g. in the case of a three-dimensional texture. This position data is in an embodiment in the form of a position index, and in an embodiment comprises at least an (x, y) position (index), but may also comprise a z position (index) (such that the cache line will be tagged with the x, y, z position of the texture data that is stored in the cache line). (A z position (index) may be used for 3D textures (volume textures), for example (and, e.g., assumed to be zero (0) in the case of a 2D texture).)

In an embodiment as well as being associated with (tagged with) a position for the texture data that is stored in the cache line, a (and each) cache line in the second cache also has associated with it (is tagged with) further information relating to the texture data that is stored in the cache line, and in particular, information that further facilitates identifying and/or using the texture data that is stored in the cache line.

In an embodiment, a (and each) cache line in the second cache also has associated with it (is tagged with) one or more of, and in an embodiment all of, the following information:

an indication of which surface of the texture the data in the cache line belongs to;

an indication of the format (the texture data format) used for the texture data in the cache line;

an indication of the layout of the texels for which the texture data is stored in the cache line (e.g. whether they are in a linear or Morton order, etc.).

The data processing unit that is intermediate the first cache and the second cache and operable to process data stored in the first cache and to store the processed data in the second cache for use by the graphics processing system when generating a render output can process the data stored in the first cache in any suitable and desired manner.

In an embodiment, the data processing unit is able to, and operable to, decode (and in an embodiment decompress) texture data that is stored in an encoded (compressed) form in the first cache and to then store the decoded (decompressed) texture data in the second cache (i.e. to store the texture data in the second cache in a decoded (an uncompressed) form) for use by the graphics processing unit. In this case therefore, the data processing unit will comprise appropriate decoding (decompressing) circuitry operable to be able to decompress texture data stored in a compressed format for providing to the second cache. The data processing unit in this arrangement may be operable to perform any suitable and desired decoding (decompression) operation, such as, e.g., and in an embodiment, in dependence on the compression formats that may be used for the texture data.

Thus, in an embodiment, the data processing unit intermediate the first cache and the second cache is operable to (and operates to) decode (decompress) texture data that is stored in the first cache in a compressed form, and to store the decoded (decompressed) data in the second cache for use by the graphics processing unit when generating a render output. Correspondingly, the method of the technology described herein in an embodiment comprises the data processing unit decoding (decompressing) texture data loaded into the first cache and storing the decoded (decompressed) data in the second cache.

Thus, in an embodiment, the method of the technology described herein comprises loading compressed texture data from the memory into the first cache of the cache system, and the data processing unit: reading the compressed data from the first cache, decompressing the compressed texture data read from the first cache, and storing the decompressed texture data in the second cache (with the graphics processing unit then using the decompressed texture data stored in the second cache to perform a texturing operation).

This operation can allow compressed texture data to be decompressed for provision to the graphics processing unit in a more efficient manner. For example, it allows the graphics processing unit to read the texture data from the second cache in an uncompressed manner, such that in cases where the texture data may be repeatedly used (as may be likely) by the graphics processing unit, that avoids the need to decompress the texture data each time it falls to be used by the graphics processing unit (rather, only a single decompression operation needs to be performed when the data is initially loaded into the second cache).

Furthermore, in the case where texture data is stored in a compressed form in the main memory, it is likely that any texturing operation will not require a full cache line's worth of the compressed texture data. However, reading the texture data in a compressed format into the first cache of the system facilitates still reading and loading an entire cache line into the first cache (therefore avoiding the need for any modifications to the existing cache system operation of the data processing system). It also means that the compressed texture data that is stored in the memory can still be retained in the first cache for later transfer to the second cache should it be required (which may be likely in a typical texturing operation), without the need to make a further request to the main memory for that texture data. This may then further enhance the efficiency of the fetching of the texture data from the main memory, because in the case where compressed data from other parts of a given cache line stored in the main memory is required, multiple requests to the main memory for that same cache line may be avoided.

Also, by tagging the texture data stored in the second cache using a position in the texture, rather than a memory address, that removes the need to have that texture data stored in the second cache in alignment with the main memory addresses where that texture data is stored, which accordingly further facilitates rearranging and/or decompressing the texture data before it is stored in the second cache, as there is no longer any need for the data to be stored in the second cache in "alignment" with the way that the data is stored in the main memory.

In an embodiment, the data processing unit intermediate the first cache and the second cache can also or instead (and in an embodiment also) operate to read data stored in the first cache and to store the read data in the second cache in a different arrangement (e.g. format) to the way that that data was stored in the first cache. In this case therefore, the processing that the data processing unit performs would and does comprise rearranging (e.g. converting the format of) the data stored in the first cache when it stores the data in the second cache.

Thus, in an embodiment, the data processing unit is operable to (and operates to) process texture data that is stored in the first cache in a first arrangement so as to store the data in the second cache in a different arrangement to that first arrangement.

Correspondingly, the method of the technology described herein in an embodiment comprises loading texture data from the memory into the first cache so as to be stored in a first arrangement in the first cache, and the data processing unit reading the data from the first cache and storing the data in the second cache in a different arrangement to that first arrangement (with the graphics processing unit then using processed texture data stored in the second cache to perform a texturing operation).

The "rearranging" operation that is performed by the data processing unit could, and in an embodiment does, comprise rearranging (converting) the format that individual texture data elements (e.g. texels) are stored in from the first cache to the second cache. In this case therefore, the data processing unit will be operable to convert the texture data from the format that it is stored in the first cache to store it in a different format in the second cache. An example of this would be converting texture data that is in a luminance/alpha-format to an RGBA format in the second cache. Thus in one embodiment, the method of the technology described herein comprises loading texture data from the memory into the first cache so as to be stored in a first format in the first cache, and the data processing unit reading the data from the first cache and storing the data in the second cache using a different format for each texture data element (texel) to the format that is used for the texture data elements (texels) in the first cache.

The "rearranging" operation can also or instead (and in an embodiment also) comprise rearranging the order and/or distribution of the data for individual texture data elements (texels) relative to each other compared to the arrangement of the texture data elements and their data relative to each other in the first cache.

This could comprise, for example, where a given cache line in the first cache stores the data for a set of texture data elements in a particular order (sequence), storing the data for those texture data elements (texels) in a different order (sequence) (e.g. arrangement) in the second cache. This could comprise, for example, reordering the texture data elements in a given cache line, distributing the texture data elements over plural cache lines in the second cache where they are stored in a single cache line in the first cache, and/or storing texture data elements that are stored in different cache lines in the first cache in the same cache line in the second cache.

In an embodiment, this operation comprises storing the texture data from the memory in the first cache such that different types of texture data (e.g. data channels of the texture data) are stored in respective, different cache lines in the first cache, with the data processing unit then operating to store respective groups of those different types of texture data in the same cache line in the second cache.

For example, in this operation, in the case where YUV data is stored separately as Y, U and V data (in a multi-plane format) in the memory (and thus in the first cache), the data processing unit could, and in an embodiment does, operate to rearrange the separately stored YUV data in the first cache into respective groups of YUV data corresponding to respective texels (as discussed above) in the second cache.

Thus, in an embodiment, the operation of storing the texture data into the second cache is operable to group the data values for data positions in the texture together, e.g., and in an embodiment, in the case of a YUV texture so as to store the data values for respective groups of a chrominance data element (position) and its associated set of one or more luminance data elements (positions) together in the cache (in adjacent data positions (fields) in the cache, and in an embodiment together in the same common defined data unit (data word) in the cache).

Thus, in an embodiment, the method of the technology described herein comprises (and the graphics processing system is correspondingly configured to), in the case where a YUV texture is stored as one or more separate arrays of chrominance data elements and a separate array of luminance data elements in the first cache, the data processing unit reading the data value(s) for the chrominance data element(s) and the data values for the set of luminance data elements that correspond to that chrominance data element in the texture separately from the first cache, but then storing those data values together (e.g. in a data unit (data word)) in a line of the second cache.

The converse operation could also be performed, for example where the texture data is stored in the memory (and thus in the first cache) such that two different types of texture data are stored together (e.g. in the same cache line), to split (divide) that texture data into its two (or more) different types, so as to store the different types of texture data in different cache lines in the second cache.

Thus, in an embodiment the operation comprises loading the texture data into the first cache such that different types (e.g. data channels) of the texture data are stored together in the same cache line in the first cache, with the data processing unit then operating to store that texture data in the second cache such that the different data types (e.g. data channels) are stored in respective different cache lines in the second cache.

This latter arrangement may be appropriate where, for example, the texture data relates to luminance and depth data which is stored together in the main memory, but is to be handled differently by the graphics processing unit when generating a render output.

Thus, in an embodiment, the texture data rearranging/format conversion operation may, and in an embodiment does, comprise one or more or all of:

combining texture data provided to the first cache from plural different main memory transactions (fetches) into the same cache line and/or data unit in the second cache;

rearranging data bits within texture data (e.g. texels) stored in the first cache when storing that data in the second cache;

rearranging (changing) the order that the texels are stored in with respect to the order that they are stored in in the first cache when storing the texels in the second cache; and converting the data format used for the texture data from the format that the data is stored in in the first cache when storing the texels in the second cache.

Other arrangements would, of course, be possible.

These arrangements may be particularly advantageous where, for example, the format arrangement of the texture data in the main memory is not the optimum or desired format for the use of that texture data by the graphics processing unit. For example, by rearranging and storing YUV texture data in the second cache in such groups, the second cache may need to be read fewer times to read the required texture data for an image to be processed, compared, for example, to cases where the chrominance and luminance texture data is stored in separate lines and/or data words in the cache.

The two-level (two stage) cache arrangement of the technology described herein, together with the intermediate data processing unit, facilitates rearranging and changing the texture data from the arrangement/format that it is stored in in main memory to a more suitable or desired format to be used by the graphics processing unit, without significantly adding to the power or resource requirements of the overall graphics processing system.

In an embodiment, in order to facilitate these operations, the data processing unit is able to perform "unaligned" reads of texture data from the first cache (i.e. the data processing unit can read amounts of data from the first cache in units other than a whole cache line (that do not correspond to an entire cache line) of the first cache). Thus, the data processing unit can in an embodiment read amounts of data from the first cache having a length that does not correspond to an entire cache line of the first cache, and/or (and in an embodiment and) that do start at a memory address that is (exactly) divisible by the amount of data that an entire cache line stores.

In an embodiment, the data processing unit can read less than an entire cache line from the first cache (for a given read operation). In an embodiment the data processing unit can read data from the first cache in units of one or more, and in an embodiment as single, bytes. This will then facilitate the data processing unit being able to read the texture that is stored in a cache line in the first cache that it requires (e.g. to be decompressed to constitute an entire cache line in the second cache), rather than having to read an entire cache line from the first cache (which may accordingly comprise data that is not in fact required by the data processing unit). This can then again reduce the power and resources required by the cache system, as it can allow the data processing unit to more efficiently read the data that is actually required from the first cache.

Thus, correspondingly, in an embodiment, the first cache is operable to accept "unaligned" reads (i.e. reads that do not correspond exactly to an entire cache line, and that, as discussed above, in an embodiment correspond to individual bytes of data in a given cache line). Thus, in an embodiment, the first cache is configured such that it is not necessary to read full (complete) cache lines from that first cache, but smaller portions of a cache line can be read from that first cache, such as, and in an embodiment, performing byte-aligned reads.

Thus, in an embodiment, the method of the technology described herein comprises the data processing unit reading less than an entire cache line of texture data from the first cache and storing that texture data in the second cache. Correspondingly, this operation may, and in an embodiment does, comprise the data processing unit reading less than an entire cache line data from each of plural different cache lines in the first cache, but storing that read data (e.g. in a rearranged or decompressed form) in the same cache line in the second cache (for use by the graphics processing unit to perform a texturing operation).

Thus, in an embodiment, the method of the technology described herein comprises (and the data processing unit is operable to) read less than an entire cache line of data from a first cache line of the first cache and store that texture data in a cache line of the second cache, and read less than all of the cache line of texture data from a second, different cache line of the first cache and to store that read texture data in the same cache line in the second cache as the data read from the first cache line of the first cache.

Conversely, the method of the technology described herein in an embodiment comprises (and the data processing unit is in an embodiment operable to) read some but not all of the texture data stored in a cache line of the first cache and store that texture data in a cache line of the second cache, and read another, different portion of some but not all of the texture data that is stored in the cache line of the first cache, and store that further texture data in a different cache line of the second cache.

Correspondingly, in an embodiment, in order to facilitate these operations, the data processing unit is able to perform "unaligned" writes of texture data to the second cache (i.e. the data processing unit can write amounts of data to the second cache in units other than a whole cache line (that do not correspond to an entire cache line) of the second cache). Thus, the data processing unit can in an embodiment write amounts of data to the second cache having a length that does not correspond to an entire cache line of the second cache and/or (and in an embodiment and) that do start at a memory address that is (exactly) divisible by the amount of data that an entire cache line stores.

In an embodiment, the data processing unit can write less than an entire cache line to the second cache (for a given write operation). In an embodiment the data processing unit can write data to the second cache in units of one or more, and in an embodiment as single, bytes.

Thus, correspondingly, in an embodiment, the second cache is operable to accept "unaligned" writes (i.e. writes that do not correspond exactly to an entire cache line, and that, as discussed above in an embodiment correspond to individual bytes of data in a given cache line). Thus, in an embodiment, the second cache is configured such that it is not necessary to write full (complete) cache lines to the second cache, but smaller portions of a cache line can be written to the second cache, such as, and in an embodiment, performing byte-aligned writes.

In order to facilitate this operation (and otherwise), the first and/or second caches are in an embodiment configured so as to be modifiable at a suitable level of data subdivision. For example, the caches may be modified at the level of a single bit or a single byte. In an embodiment, the caches are modifiable in units of four bits.

This may be achieved as desired, for example, by utilising bit-strobes for the cache reads and writes. For example, bit-enables may be set for the desired data positions in a cache line when writing data in the cache line (and correspondingly for reads). For example, a write operation could be configured to (always) write a particular number of bits, but write masks could then be used to set which actual bits within that particular number (set) of bits should (and will) be modified in the cache (and correspondingly for reads).

Although, as discussed above, in an embodiment "unaligned" reads can be performed from the first cache, in an embodiment, the cache system still operates to perform aligned reads (only) to the main memory for texture data. In other words, the fetching of texture data into the first cache from the main memory is in an embodiment performed by (and in an embodiment only by) fetching an entire cache line into the first cache. This then facilitates the interoperability of the cache system of the technology described herein with the main memory system and cache hierarchy of the overall data processing system (and, e.g., avoids the need to modify, e.g. the L2 cache, operation of the data processing system for the purposes of the cache system of the technology described herein). Thus, the fetching of the data from the main memory into the first cache of the cache system is in an embodiment performed in cache-aligned units of data.

The texture data can be fetched from the memory where it is stored and loaded into the cache system of the technology described herein in any suitable and desired manner (e.g. that is compatible with the overall memory and cache operation of the overall data processing system).

Thus, in an embodiment, the technology described herein further comprises (and the graphics processing system is further configured to) fetching texture data from the memory and storing it in the cache system in the required manner.

In order to fetch the data into the cache system, the data processing system will need to send appropriate memory requests to the memory (memory system) for the texture data. These requests may be, and are in an embodiment, triggered by the graphics processor attempting to read texture data from the cache system, or checking whether required texture data is stored in the cache system, and then finding that that texture data is not present in the cache system (i.e. encountering a cache miss). A request is in an embodiment then sent to the memory system to fetch the "missing" data, and in an embodiment to fetch plural groups of texture data (e.g. corresponding to a region of the texture) (e.g. for, or sufficient to fill, a cache line) that includes the desired "missing" texture data.

Thus, in an embodiment the graphics processing unit (and in an embodiment the texture mapper of the graphics processing unit) is operable to request texture data by sending a texture data request to the cache system, with the cache system then operating in response to such a request to fetch the required data (if it's not already present in the cache system) from the memory system.

In an embodiment, the graphics processing unit (and in an embodiment the texture mapper of the graphics processing unit) is operable to (and operates to) request texture data by sending a texture data request to the second cache of the cache system (with the cache system then operating in response to such a request to either return the texture data to the graphics processing unit (e.g. the texture mapper), or to fetch the required data into the second cache of the cache system (if it's not already present in the second cache of the cache system).

In an embodiment, the graphics processing unit (e.g. texture mapper) addresses the second cache for the texture data using the appropriate texture position (as the texture data is identified in the second cache using a texture position).

In an embodiment, in the case where it is determined that the required texture data is not stored in the second cache, it is first then determined whether the required texture data is stored in the first cache. In the event that the texture data is stored in the first cache, the texture data is in an embodiment transferred from the first cache to the second cache (e.g., and in an embodiment, by the data processing unit).

On the other hand, if the texture data is not found to be present in the first cache, then a request is in an embodiment sent to the memory system in order to fetch the data from the memory and store that data into, in an embodiment, the first cache (although, as will be discussed further below, it is envisaged that texture data may be stored directly into the second cache from the memory bypassing the first cache). Thus, if the texture data is not already stored in the first cache of the cache system, then appropriate memory requests are in an embodiment sent to the memory system to fetch that data into the first cache.

In the case where the texture data is being sought from the first cache (or is needed to be loaded from the memory system), then in an embodiment, that texture data request uses and addresses the first cache (or the memory) using the appropriate memory address where the texture data for the texture position will be stored in memory (as the texture data is identified in the first cache using a memory address).

Thus, when fetching the data from the first cache, or from memory into the first cache, the texture position that is used to address the second cache is in an embodiment converted to the appropriate memory addresses where the texture data for that texture position is stored in memory.

Thus, the method in an embodiment comprises (and the graphics processing system is further configured to), for a texture position for which texture data is required (to be sampled), (and for which texture is determined to not already be stored in the second cache), converting that texture position into one or more memory addresses for that texture data (to memory addresses or address where texture data including texture data for that texture position is stored).

A texture position may be converted into a single memory address, or may be converted into two or more memory addresses, e.g. depending upon how the texture data required for each texture position (the texture position in question) is stored in the memory.

The conversion of a texture position to a memory address (or to two or more memory addresses) could be done in any suitable and desired manner. For example, and in an embodiment, it may be done by applying one or more predefined rules or formulae for such a conversion. Alternatively, it could be done by using a look-up table or other suitable means.

The texture position itself may be indicated in any desired way. For example, and in an embodiment, the texture position is indicated as a fractional position across the width and a fractional position across the height of the texture, for example by providing x and y coordinates in the range 0 to 1 or −½ to +½.

The technology described herein may comprise performing one or more memory requests to fetch required texture data from memory into the first cache (a cache line). The number of memory requests may depend on how the texture data is stored in the memory, and, for example, the number of (different) locations at which it is stored. The number of memory requests may also (or alternatively) depend on the arrangement of groups of texture data to be stored in the first cache or cache line.

When each memory request returns, which could, for example, be in any order (indeed, the operation in an embodiment supports "out of order" data fetching, or data fetching in any order), the data values are in an embodiment written into the cache line in an appropriate data position (e.g. in the appropriate bits) depending on their corresponding position in the texture. A memory request may include, e.g., an indication of one or more of: the cache line and position in the cache line where the data is to be stored, the format that the data is to be stored in in the cache, etc., to facilitate this.

Thus, the groups of texture data (texels) may in an embodiment be fetched from memory in any order. They may in an embodiment also be stored in a cache line in any order in time. Thus, data units (e.g. data words) in a cache line may in an embodiment be filled in any order.

In an embodiment, a cache line is (only) indicated as being "valid" (i.e. that all of the requested texture data is stored in the cache line and therefore available for use) once all of the memory requests for the cache line have been returned. For example, the number of memory requests sent and returned may be tracked and/or recorded in order to determine when all of the memory requests have been returned. In an embodiment, this comprises using a reference count corresponding to the number of memory requests needed to fill the cache line.

Any suitable cache "filling" arrangement can be used to select the cache line or lines into which fetched texture data is stored, such as a least recently used cache line replacement arrangement, etc.

Although the technology described herein has been described above with particular reference to the loading of texture data from the memory system into the first cache and the transfer of that data from the first cache to the second cache by the data processing unit, in an embodiment it is also possible to bypass the storing of the texture data in the first cache. In this case, the texture data could be stored directly in the second cache from the memory system, but in an embodiment it is still passed via the data processing unit which unit then stores that data in the second cache. This may be appropriate where, for example, the texture data is stored in the memory system in the form that it is desired to be used and needed for use by the graphics processing unit, such that intermediate storage of the texture data in the first cache is accordingly unnecessary.

Such bypassing (omitting) of the storing of the texture data in the first cache could be triggered in any suitable and desired manner. In an embodiment, the texture data request operation determines whether the texture data can be used in its "raw" form stored in the memory, and, if so, configures the request for the texture data accordingly (so as to indicate that intermediate storage of the texture data in the first cache is not required, and the texture data can be loaded directly to the second cache from the memory instead). The memory request operation in an embodiment then proceeds accordingly.

In this case therefore the texture data will be loaded into the second cache without first being loaded in the first cache, e.g., and in an embodiment, in dependence upon one or more particular, in an embodiment selected, in an embodiment predefined, conditions or criteria being met (or not). In an embodiment it is dependent on the format of the texture data, with, e.g., and in an embodiment, one or more particular, in an embodiment selected, in an embodiment predefined, formats being set as able to be (and being) loaded into the second cache bypassing the first cache.

Once the texture data has been stored in the second cache (in a cache line of the second cache), it may be, and is in an embodiment, read from the second cache (a cache line of the second cache) for use in a texturing operation, e.g. for rendering a render output, such as an image to be displayed.

The texture data that is required will typically, and is in an embodiment, indicated by indicating a position in the texture that is to be sampled (for which the texture data is required).

Correspondingly, in an embodiment, the graphics processing unit (e.g. the texture mapper of the graphics processor) addresses the second cache using a position for the texture that is indicative of the texture data that is required.

As described above, the position to be sampled in the texture (the texture or sampling position) may be indicated as desired. In an embodiment it is indicated as a fractional position across the width and a fractional position across the height of the texture, for example by providing x and y coordinates in the range 0 to 1 or −½ to +½.

In an embodiment, the indicated sampling position is mapped to the position of a texture data element in the texture (and in an embodiment to the position of a closest data element (e.g. one, and in an embodiment a top left, of four closest data elements to the sampling position) in the texture), i.e. to a corresponding data element (texel) index in the texture.

The texture data element (texel) index may be derived as desired from the indicated sampling position. In an embodiment, the texel index is determined from the indicated sampling position and the width and height of the texture defined in terms of the number of data positions across the width and height of the texture (respectively).

In an embodiment, for a YUV texture, the texel index (texture data position) determination also takes account of the relative position of a chrominance data position to its set of one or more associated luminance data positions (of the chroma-"siting" for the texture).

Once the texture element position in the texture has been determined, that determined position can then be and is in an embodiment used to read the corresponding data for the group of texture data (the texel) stored in the second cache for that determined texture data position (used to address the second cache to retrieve the texture data from the cache).

It would be possible in this regard simply to read and use a single group of texture data (texel) to determine the data for a position to be sampled in a texture. However, in an embodiment, the texturing process is operable to interpolate the values for a position in a texture from the data values for plural defined texture data element positions in a texture. In an embodiment, the data values for a position in a texture are determined using bilinear interpolation of data values for texture data elements in the texture.

Accordingly, in an embodiment, a set of 2×2 texels in a texture is identified and used to determine the data values for the position in that texture that is to be sampled. This could be done, e.g. by determining respective texel indices for each texel separately, or by identifying a single texel position (index) so as to identify the texel position of one of the texels in the 2×2 set of texels that are to be used (and in an embodiment so as to identify the top-left texel of the 2×2 texel block), with the other (e.g. three) texels of that 2×2 set then being identified (determined) accordingly.

Once the indices of the texture data values closest to the sample position have been determined, the groups of texture data values (texels) corresponding to those texture data values are in an embodiment read from the second cache.

This fetched texture data is then in an embodiment used to perform a texturing operation for the sample position in question.

Other arrangements would, of course, be possible. For example, there could be no interpolation performed, with the texture data for one texel corresponding to a sampling position simply being read and used as the texture data for that sampling position.

Although the technology described herein has been described above primarily with reference to the operation of the overall graphics processing system, the technology described herein also extends to the cache system of the technology described herein on its own.

Thus another embodiment of the technology described herein comprises a cache system for use in a graphics processing system that comprises a memory system and a graphics processing unit;
  the cache system comprising:
  a first cache operable to receive texture data from a memory system;
  a second cache operable to receive texture data from the first cache and to provide texture data to a graphics processing unit for use when generating a render output; and
  a data processing unit intermediate the first cache and the second cache and operable to process data stored in the first cache and to store the processed data in the second cache for use by the graphics processing unit when generating a render output.

As will be appreciated by those skilled in the art, this embodiment of the technology described herein can, and in an embodiment does, include, as appropriate, any one or more or all of the features of the technology described herein described herein.

The texture that is being used in the technology described herein may be any suitable and desired graphics texture. In an embodiment, it represents an image (a frame) to be displayed.

The technology described herein can be used irrespective of the format of the texture data that is being used. Thus it can, for example, be used for both RGB (or RGBA) and YUV (and PUVA) texture data, as desired. In the case of a YUV texture, the YUV texture may be configured according to any desired and suitable chroma sub-sampling mode. In an embodiment it is configured according to one of the three modes: YUV444, YUV422 or YUV420. Other chroma sub-sampling modes may also be used.

The technology described herein can also be used with other texture formats, such as with textures that are used for depth and/or stencil data (values), and where graphics textures and texture processing are being used to store and process other forms of data (not just colours and images), if desired.

The technology described herein can correspondingly be used for any form of output that a graphics processing system may be used to generate. In an embodiment it is used when a graphics processing system is being used to generate images for display, but it can be used for any other form of graphics processing output, such as graphics textures in a render-to-texture operation, etc., that a graphics processing system may produce, as desired.

As will be appreciated from the above, the technology described herein is in an embodiment implemented in a system comprising a memory system, a cache system, and a graphics processing unit (GPU) (a graphics processor). Texture data for a render output (e.g. image to be displayed) is in an embodiment stored in a memory of the memory system. The GPU is in an embodiment arranged to fetch required texture data from the memory and to store it in the cache system, in the manner described above. The GPU then in an embodiment reads required texture data from the cache system for generating the render output (e.g. in the manner described above). The render output, once generated in this way, is then in an embodiment displayed, e.g. on a display such as a digital television, computer screen or the like.

The graphics processing unit (graphics processor) will, and in an embodiment does, implement and execute a graphics processing pipeline to perform graphics processing.

In an embodiment, the graphics processing system includes a host processor that executes applications that can require graphics processing by the graphics processing unit. The system in an embodiment further includes appropriate storage (e.g. memory), caches, etc.

The technology described herein can be used in and with any suitable and desired graphics processing system and processor.

The technology described herein is particularly suitable for use with tiled renderers (tile-based graphics processing systems). Thus, in an embodiment, the graphics processor (processing pipeline) is a tiled-based graphics processor (processing pipeline).

The graphics processing unit (processor) (processing pipeline) can include, and in an embodiment does include, any one or more, and in an embodiment all, of the processing stages that a graphics processor (processing pipeline) can normally include. Thus, for example, the graphics processing unit in an embodiment includes a primitive setup stage, a rasteriser and a renderer. In an embodiment the renderer is in the form of or includes a programmable fragment shader (a shader core).

The graphics processor (processing pipeline) in an embodiment also comprises one or more programmable shading stages, such as one or more of, and in an embodiment all of, a vertex shading stage, a hull shader, a tessellation stage (e.g. where tessellation is performed by executing a shader program), a domain (evaluation) shading stage (shader), a geometry shading stage (shader), and a fragment shader.

The graphics processor (processing pipeline) may also contain any other suitable and desired processing stages that a graphics processing pipeline may contain such as a depth (or depth and stencil) tester(s), a blender, a tile buffer or buffers, a write out unit etc.

The graphics processing system and/or processor in an embodiment also comprises, and/or is in communication with, one or more memories and/or memory devices that store the data described herein, and/or that store software for performing the processes described herein. The graphics processing system and/or processor may also be in communication with a host microprocessor, and/or with a display for displaying images based on the data generated by the graphics processor (processing pipeline).

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In some embodiments, the technology described herein is implemented in computer and/or micro-processor based system.

The various functions of the technology described herein can be carried out in any desired and suitable manner. For example, the functions of the technology described herein can be implemented in hardware or software, as desired. Thus, for example, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described.

FIG. 1 shows an exemplary data processing system in which the technology described herein and the present embodiment may be implemented.

Figure 12:
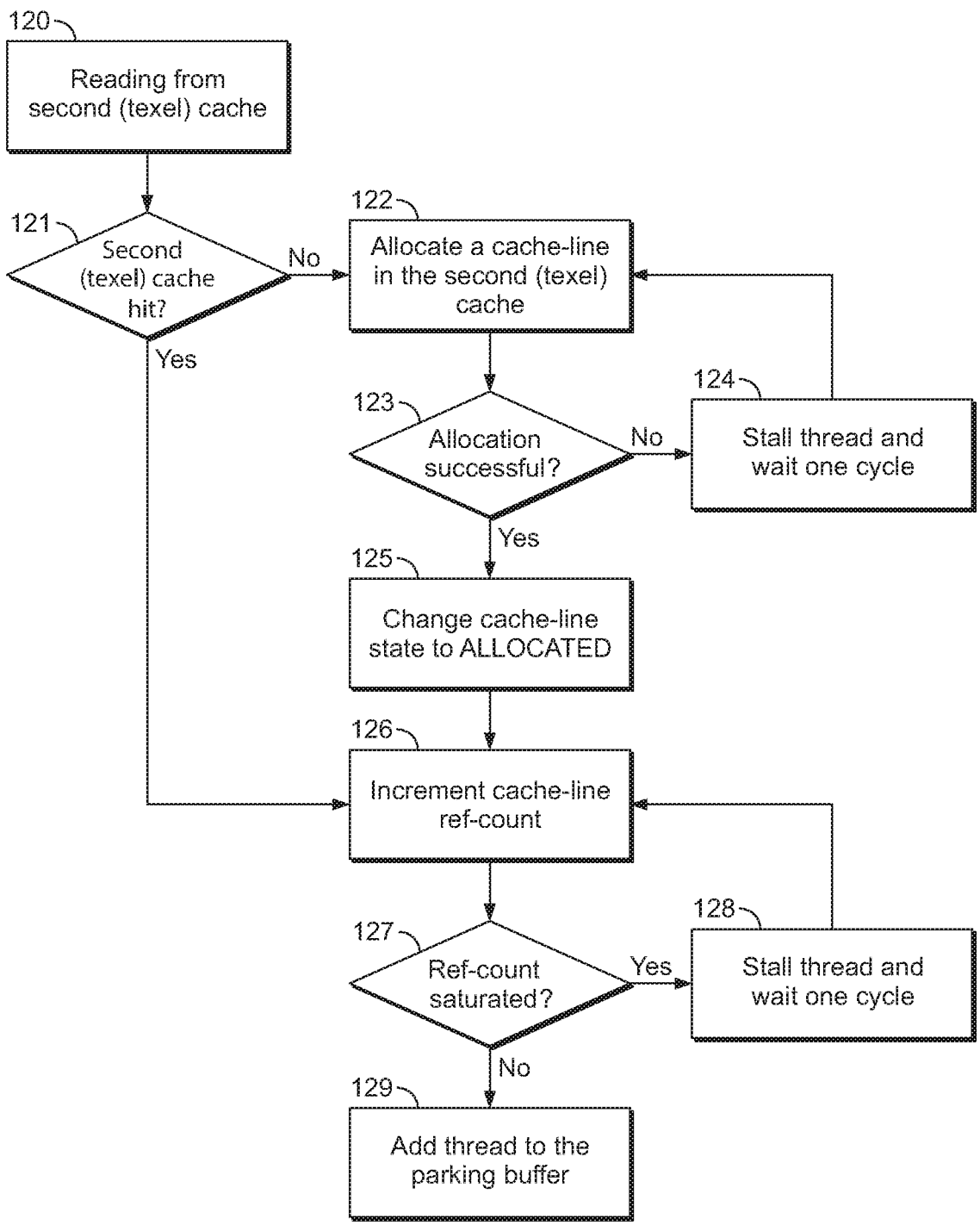
FIG. 12 is a flowchart showing the operation of fetching data from the second cache in the texture cache system in an embodiment of the technology described herein.

The exemplary data processing system shown in FIG. 1 comprises a host processor comprising a central processing unit (CPU) 57, a graphics processing unit (GPU) 10, a video codec 51, a display controller 55, and a memory controller 58. As shown in FIG. 12, these units communicate via an interconnect 59 and have access to an off-chip memory system (memory) 20. In this system the GPU 10, video codec 51, and/or a CPU 57 will generate frames (images) to be displayed, and the display controller 55 will then provide the frames to a display 54 for display.

In use of this system, an application 60, such as a game, executing on the host processor (CPU) 57, will, for example, require the display of frames on the display 54. To do this, the application 60 will submit appropriate commands and data to a driver 61 for the graphics processing unit 10 that is executing on the CPU 57. The driver 61 will then generate appropriate commands and data to cause the graphics processing unit 10 to render appropriate frames for display and to store those frames in appropriate frame buffers, e.g. in the main memory 20. The display controller 55 will then read those frames into a buffer for the display from where they are then read out and displayed on the display panel of the display 54.

The present embodiments and the technology described herein relate in particular to the situation where the graphics processing unit 10 is using a texture when rendering a frame for output (e.g. for display). Such textures will comprise arrays of data elements (texture elements (texels)), each having an associated data value or values in the data format of the texture in question.

The textures will typically comprise images that are to be applied to graphics entities, such as primitives, to be rendered, and will normally be stored in the off-chip memory 20 from where they can then be read in by the GPU 10 when required. In particular, when using a texture to generate a render output, the GPU 10 will fetch the texture data from the memory 20 and store it in a local, texture cache of the GPU 10. The texture data will then be read from the texture cache, when needed, and used to generate the render output, e.g. frame for display.

Figure 2:
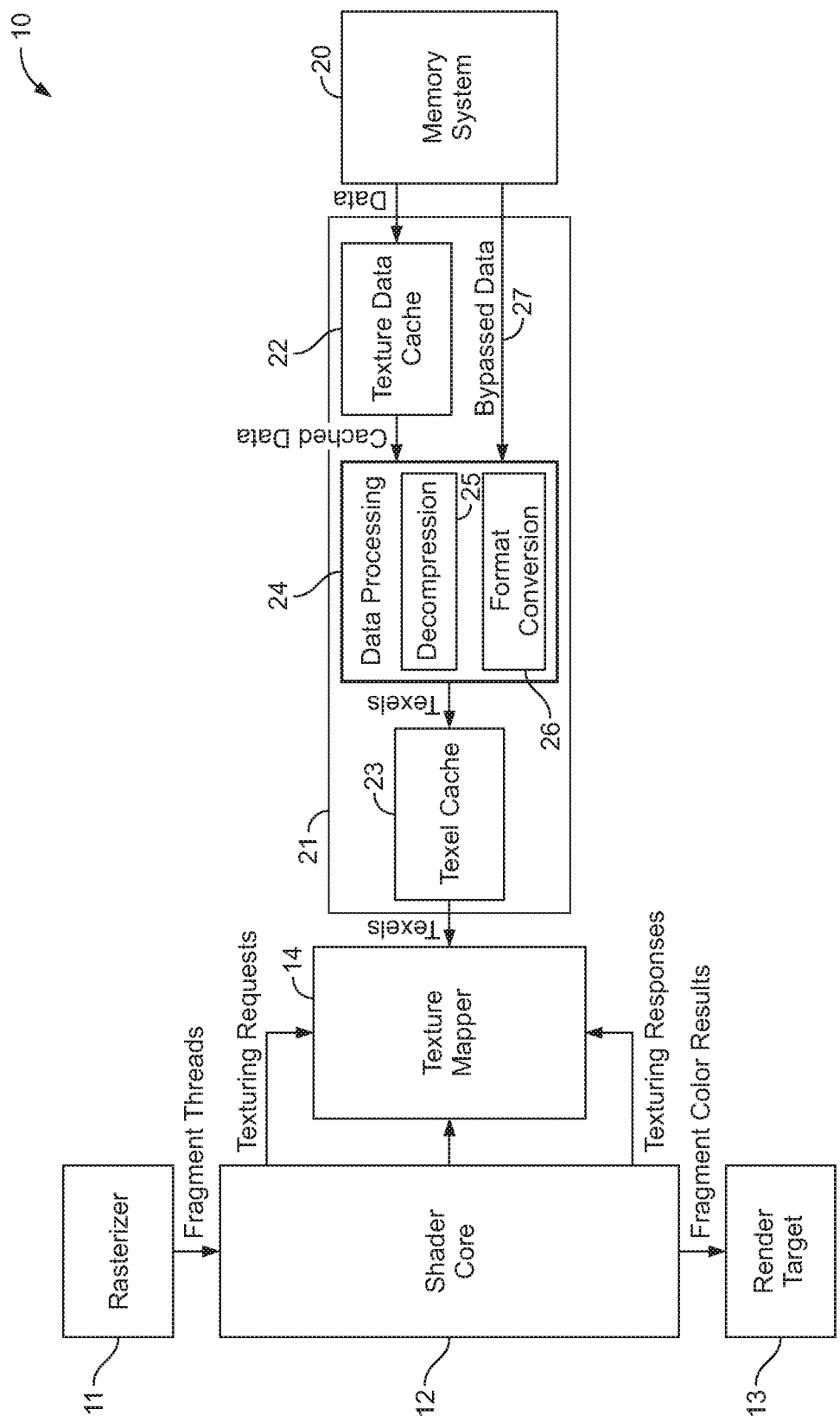
FIG. 2 shows schematically an embodiment of the technology described herein.
Figure 3:
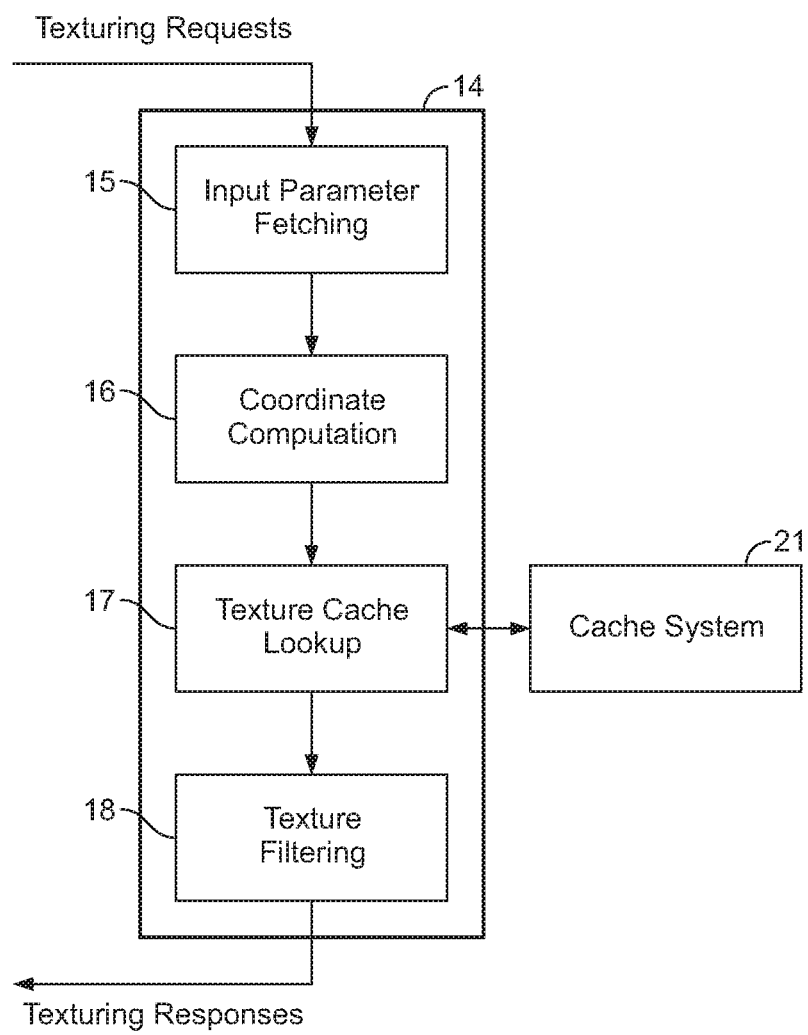
FIG. 3 shows the texture mapper of the graphics processing system of FIG. 2 in more detail.

FIGS. 2 and 3 shows schematically the elements of the graphics processing unit 10 of the system shown in FIG. 1 that are relevant to the operation of the present embodiments. As will be appreciated by those skilled in the art, there may be other elements of the graphics processing unit 10 that are not illustrated in FIGS. 2 and 3.

In the present embodiment, the GPU 10 is a tile-based graphics processor. However, other arrangements are, of course, possible.

As shown in FIG. 2, the graphics processing unit 10 implements a graphics processing pipeline that includes, inter alia, a rasterizer 11, a renderer in the form of a (programmable) shader core 1, a buffer 13 (e.g. in memory 20) for storing the output render target (e.g. frame to be displayed), and a texture mapper 14, and is in communication with the memory system 20.

The system memory 20 will store, inter alia, graphics textures to be used by the GPU 10. The system memory 20 may, e.g., be a disk drive or other storage medium (e.g. a hard disk, a RAID array of hard disks or a solid state disk) of or accessible to the host system in which the graphics processing unit 10 is located, and may be an internal storage medium of the host system, or an external or removable storage medium.

As shown in FIG. 3, the texture mapper 14 may comprise, for example, an input parameter fetching unit 15, a coordinate computation unit 16, a texture cache lookup unit 17, and a texture filtering unit 18.

As shown in FIG. 2, the texture mapper 14 interfaces with the memory system 20 via a texture cache system 21. The texture cache system 21, as shown in FIG. 2, contains a first cache 22 (a "texture data" cache) that receives data from the system memory 20, and a second cache 23 (a "texel" cache) that interfaces with the texture mapper 14 and from which the texture mapper 14 may read data of texels required for its texturing operations. The texture cache system 21 also includes a data processing unit 24 that is operable to read data from the first, texture data cache 22, process that texture data, and then provide that data to the second, texel cache 23.

The operation of the texture cache system 21 in the present embodiments will be discussed in more detail below.

The first 22 and second 23 caches of the texture cache system 21 are local memory for storing texture data, and may, e.g., comprise a RAM. They may be in the form of an SRAM memory. They each comprise a plurality of cache-lines. In the present embodiment, the second cache 23 of the cache system 21 has a greater capacity than the first cache 22, such as having twice or four times as many cache lines as the first cache.

Other arrangements would, of course, be possible.

The arrows in FIGS. 2 and 3 indicate the main ways in which data flows between the various components of the graphics processing pipeline and the memory 20. There may also be other communication routes or directions that are not indicated.

The rasterizer 11 receives as its input primitives (e.g. triangles) to be used to generate a render output, such as a frame to be displayed, and rasterizes those primitives into individual graphics fragments for processing. To do this, the rasterizer 11 rasterizes the primitives to sample points representing the render output, and generates graphics fragments representing appropriate sampling positions for rendering the primitives. The fragments generated by the rasterizer 11 are then sent onwards to the shader core (renderer) 12 for shading.

The shader core 12 executes a shader program or programs for the fragments issued by the rasterizer 11 in order to render (shade) the fragments. The shader programs may have no, one, or more, texturing instructions (texturing operations) that are required to be executed by the texture mapper 14. When a texturing instruction is encountered by the shader core 12, a texturing message is sent from the shader core 12 to the texture mapper 14, instructing the texture mapper 14 to follow one or more texturing instructions. After the texture mapper 14 has finished its texture processing (carrying out these instructions), the final result is sent back to the shader core 12 in a response message for use when shading the fragment in question.

The texture mapper 14 includes suitable processing circuitry to perform texturing instructions. This processing circuitry may, e.g., be in the form of a dedicated hardware element that is configured appropriately, or it may, e.g., comprise programmable processing circuitry that has been programmed appropriately. In an embodiment, a dedicated hardware texture mapper is used.

The "shaded" fragment from the shader core 12 is then stored as part of the output render target in the buffer 13, e.g. the main memory 20, e.g. for subsequent display.

Thus, when instructed by the shader core 12, the texture mapper 14 reads textures from the memory 20 (as required), performs various processing steps, and returns a colour sampled from the texture back to the shader core 12.

As part of this processing, the input parameter fetching unit 15 may, for example, read in the parameters of the texture to be sampled and the parameters of how to sample the texture from appropriate state information for the texture.

The coordinate computation unit 16 may, for example, receive the texturing request message from the shader core 12 containing the coordinates to sample in the texture (e.g. given in a normalized coordinate-system where (0.0, 0.0) is the top-left corner of the texture and (1.0, 1.0) is the bottom-right corner of the texture), together with the parameters read by the input parameter fetching unit, and determine the actual texel indices in the texture to be looked up from the texture cache system 21.

The texture cache lookup unit 17 may, for example, check whether the required texture data is stored in the second (texel) cache 23 of the texture cache system 21 and, if present, read the texture data from the second (texel) cache 23. For a typical bilinear lookup, texture data from four texels are read from a 2×2 texel region of the texture.

The texture filtering unit 18 may, for example, receive the four texels of the bilinear lookup from the texture cache lookup unit, and determine interpolation weights and compute a weighted average of the texture data for the sampling position in question. This is then output to (returned to) the shader core 12.

The operation of the texture cache system 21 of the present embodiments will now be described in more detail.

In the present embodiments, the first cache 22 (the texture data cache) of the texture cache system 21 stores the texture data as a copy of the bits of the texture data as stored in the memory system 20, and each cache line of the first cache 22 is tagged with the memory address of the first byte in the cache line. Thus, each cache line of the first cache 22 will store a cache-line's amount of texture data from contiguous addresses in the main memory of the memory system 20.

The second cache 23 (the texel cache) of the texture cache system 21 stores the texture data grouped as respective texels, and stores each texel using one of a set of particular, predefined, supported texel data formats. Examples of such formats would be, for example, R5G6B5, R4G4B4A4, R8G8B8A8, Y8U8V8A8, Y16U16V16A16, and so on (where the letter indicates the data channel and the number indicates the number of bits stored for that data channel). Other formats for the texture data of a texel could be used, if desired.

Thus, when using YUV texture data, the texture data is stored in the second cache 23 of the texture cache system 21 such that the YUV texture data for a particular texture position (area) is grouped together into texels as a basic unit of storage, with each texel containing the chroma (U and V) and associated luma (Y) data for the texture position (area) in question.

FIG. 7 shows examples of texels that are used for different chroma sub-sampling modes in the present embodiments. In FIG. 7 the crosses represent luma data elements and the circles represent chroma data elements.

FIG. 7(a) shows an example of a texel 1 for the YUV444 chroma sub-sampling mode, i.e. where the luma and chroma data are stored at the same resolution (there is no sub-sampling), so there is one luma sample and one chroma sample in the texel 1.

FIG. 7(b) shows an example of a texel 2 for the YUV422 chroma sub-sampling mode, i.e. where the chroma data is stored at half the resolution of luma data horizontally but at the same resolution as luma data vertically, so there are two luma samples and one chroma sample in the texel 2, arranged horizontally.

FIG. 7(c) shows an example of a texel 3 for the YUV420 chroma sub-sampling mode, i.e. where the chroma data is stored at half the resolution of luma data both horizontally and vertically, so there are four luma samples and one chroma sample in the texel 3.

In the examples in FIG. 7, the chroma samples are shown centred in each texel 1, 2, 3. This is referred to as "interstitial chroma". However, the location of the chroma samples in a texel can vary depending on the particular chroma-siting mode being used.

Thus, in the present embodiments, YUV texture data is stored in the second cache 23 in groups (as respective texels), such as those shown in FIGS. 7(a)-(c).

Corresponding arrangements are used for other texture formats, such as RGB textures.

Furthermore, each cache line in the second cache 23 stores a set of texels for a given region of the texture.

Figure 4:
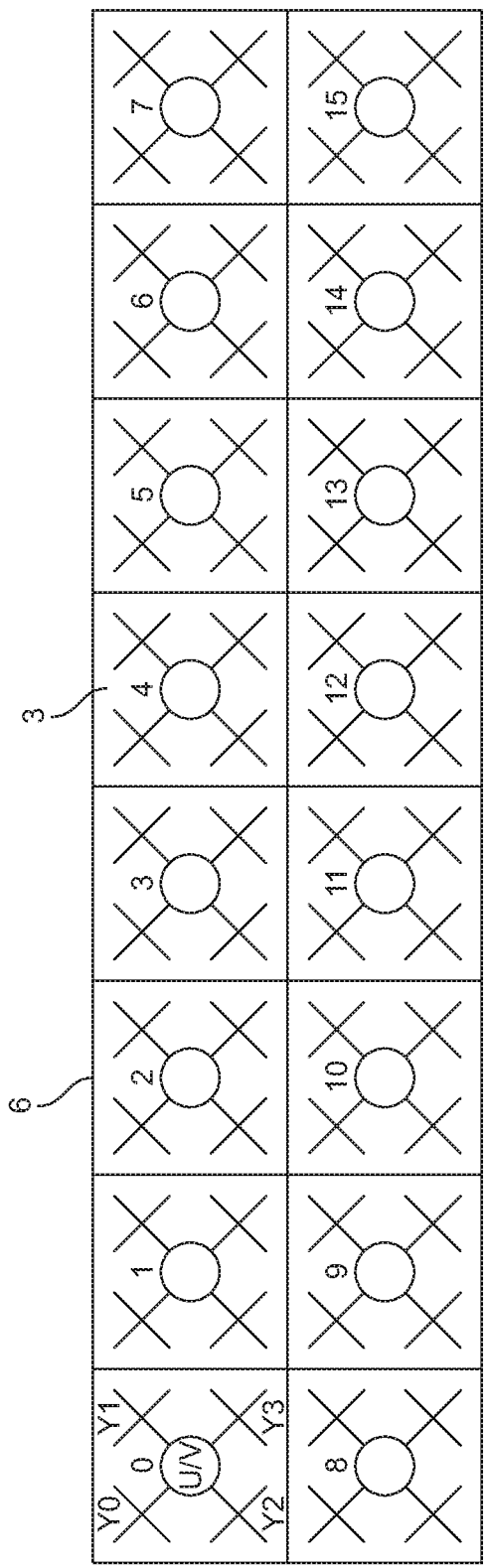
FIG. 4 illustrates a region of a texture whose texture data is stored in one texture cache line, according to an embodiment of the technology described herein.

FIG. 4 illustrates this and shows an exemplary region 6 of a texture (in this case a YUV texture) whose texture data values are stored together in a cache line in the second cache 23. In this case, the region 6 contains sixteen texels 3 in an 8×2 arrangement (two rows of eight texels). The texels 3 are numbered 0 to 15 in rows from left to right, and from top row to bottom row.

Figure 5:
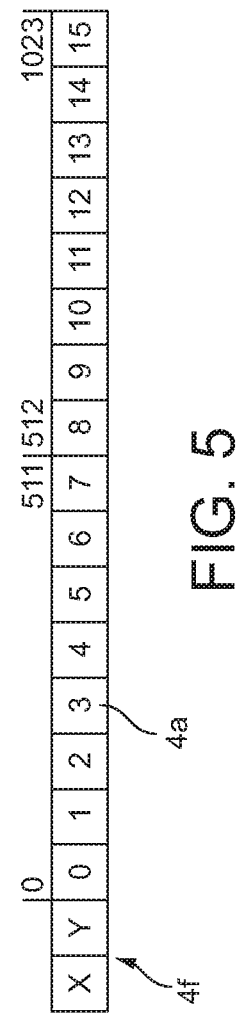
FIG. 5 shows an embodiment of how texture data from sixteen texels is stored in a cache line, according to an embodiment of the technology described herein.

FIG. 5 shows how the sixteen texels 3 from the region 6 of the texture shown in FIG. 4 can be stored in a cache line 4. The texels 3 (0 to 15) are stored in order (from 0 to 15) in consecutive data words 4a in the cache line 4. (The cache line 4 is tagged 4f, inter alia, with the X, Y position of the region (chunk) 6 of the texture that the set of sixteen texels 3 stored in the cache line correspond to (come from). This will be discussed in more detail below.)

In other embodiments, different (or the same) sized cache lines are possible, containing different numbers of texels (data words), and/or different sized data words (e.g. for different sub-sampling modes, with a different number of data fields).

Similarly, a differently configured region of the texture (e.g. a square region of the texture) could be stored in a cache line of the second cache 23, if desired. For example, e.g. in the case of the texture data in memory being in a block-based compressed form, a cache line 4 could contain 16 texels from a 4×4 block of texels. Different size and/or shape blocks could be used in other embodiments.

In the present embodiments, the data for a given texel is stored in a respective data word in a cache line of the second cache 23 (and each cache line in the second cache will store a number of data words (e.g. sixteen), with each data word storing the texture data for one texel). Each data word contains a number of data fields (e.g. depending on the texture format being used), and each data field stores the data for one texture data channel (e.g. Y, U or V, or R, G or B).

FIG. 8 shows an example of how one YUV420 texel 3, containing one U chroma value, one V chroma value, and four luma values (Y0-Y3), can be stored in a 64 bit data word 4a in a cache line of the second cache 23. In this example, 10 bits are provided in each of six fields 4b for the four luma, Y0, Y1, Y2 and Y3, and two chroma, U and V, sample values, respectively, and 4 bits are padded with dummy values (or a transparency mask (e.g.)) 4c, to get a total of 64 bits in the data word 4a.

In the embodiment shown in FIG. 8, the four luma values Y0, Y1, Y2 and Y3 are stored first in the word 4a, followed by the chroma U and V values, and then the 4 bits of dummy values 4c. However, in other embodiments, other orders of the luma, chroma and dummy (or other) values can be used.

Corresponding arrangements can again be used for other texture formats, such as RGB textures.

Each cache line 4 in the second cache 23 is provided with an associated "tag", to identify the data (the texels) that it is storing.

In the present embodiment, each cache line in the second cache (the texel cache) 23 is tagged (has associated with it) the following fields (information):
 a surface pointer indicating which surface of the texture the data in the cache line is from (belongs to);
 a format indicator indicating the format of the cache line (i.e. the format of the data for each texel in the cache line);
 a layout indicator indicating the layout (e.g. order) of the texels in the cache line (for example that they are stored in a linear order or Morton order); and
 x, y and z indices for the cache line.

The x, y and z indexes of the cache line indicate the position in the texture of the data that is stored in the cache line. (In the present embodiments, the z index in the cache line tag is used for 3D textures (volume textures). Each z index indicates a 2D "slice" of the 3D texture (thus a 3D texture is stored in the second cache as a "stack" of 2D textures, with the z index indicating the stack index, normal to the horizontal and vertical axes). For 2D textures, the z index is not used and considered to always be constant zero (0).)

Figure 6:
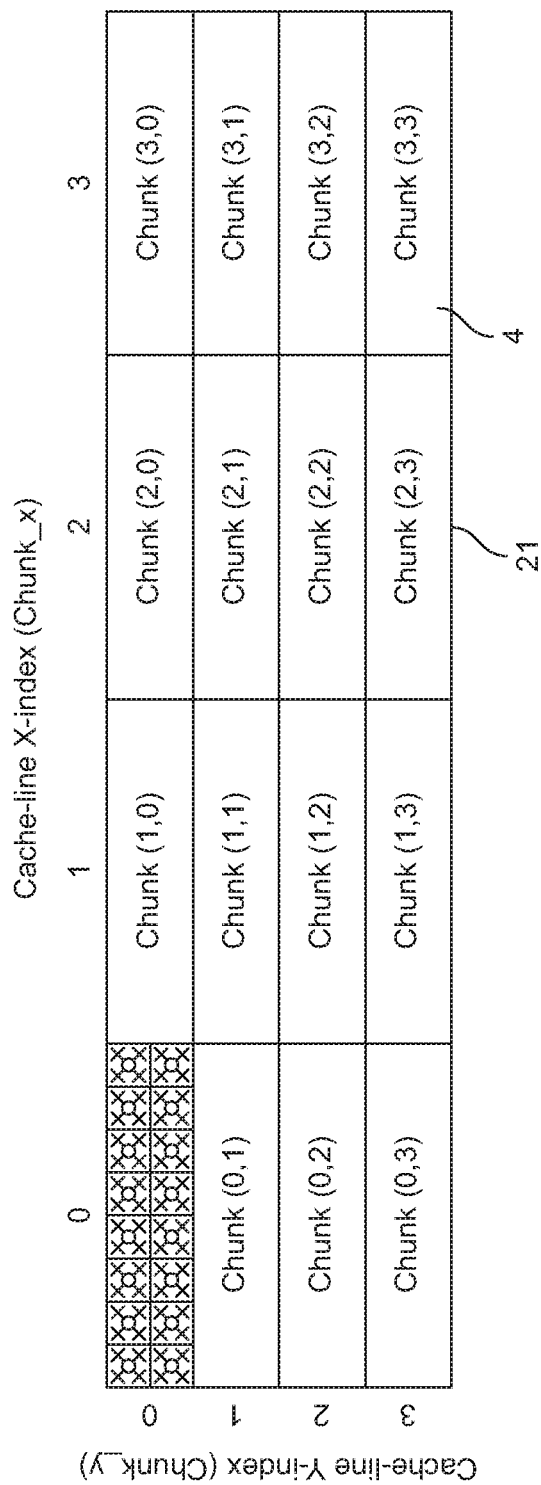
FIG. 6 shows a cache line coordinate system according to an embodiment of the technology described herein.

In the present embodiments, as discussed above, each cache line 4 within the second (texel) cache 23 stores texture data (texels) from a respective region (chunk) of the texture. This is illustrated in FIG. 6, which shows that these texture regions (chunks) can accordingly be, and are, as shown in FIG. 6, indexed in x and y (allocated respective x and y coordinates), so as to indicate their relative positions within the overall texture. (As this is a 2D texture, the z index will be "0".)

The cache lines 4 in the second (texel) cache 23 are accordingly tagged with the texture region indices (referred to as (chunk_x, chunk_y) in FIG. 6 (with the z index set to "0")) according to the position in the texture of the region (chunk) that is stored in the cache line.

Thus, in the present embodiments, the "position" tag for a cache line 4 in the second (texel) cache 23 corresponds to the "texture region" indices for the region (chunk) of the texture that the cache line is storing, as indicated in FIG. 6.

Other arrangements would, of course, be possible.

For example, in alternative embodiments the tag for a cache line 4 in the second (texel) cache 23 could comprise a position in the texture, such as the top left (x,y) coordinate of the texture region 6 being stored in the cache line 4 in question. The tag may instead correspond to a different coordinate (e.g. centre or a different corner) of the texture region 6, if desired.

As shown in FIG. 2, as well as including the first (texture data) cache 22 and the second (texel) cache 23, the cache system 21 of the present embodiment further comprises a data processing unit 24 that is intermediate the first and second caches and that is, as shown in FIG. 2, operable to be able to read data from the first (texture data cache) 22, process that data, and then store that data in the second (texel) cache 23 for use by the texture mapper 14.

The data processing unit 24 comprises an appropriate processing unit that is able to read data from the first cache 22 and write data to the second cache 23. Furthermore, as shown in FIG. 2, the data processing unit 24 is operable to be able to perform decompression 25 of texture data stored in the first (texture data) cache 22, and is able to perform format conversion 26 of texture data read from the first (texture data) cache 22, before storing that data in the second (texel) cache 23 for use by the texture mapper 14. The data processing unit 24 includes appropriate processing circuitry to perform these operations (which may be in the form of fixed function processing circuitry and/or programmable processing circuitry that can be programmed to perform the desired operation).

In the case of a decompression operation, the texture data will be loaded from the main memory 20 in a compressed form into the first cache 22. The data processing unit 24 will then read that compressed data from the first cache 22 and perform a decompression operation on that data, and then store the decompressed texture data appropriately in the second cache 23.

Figure 9:
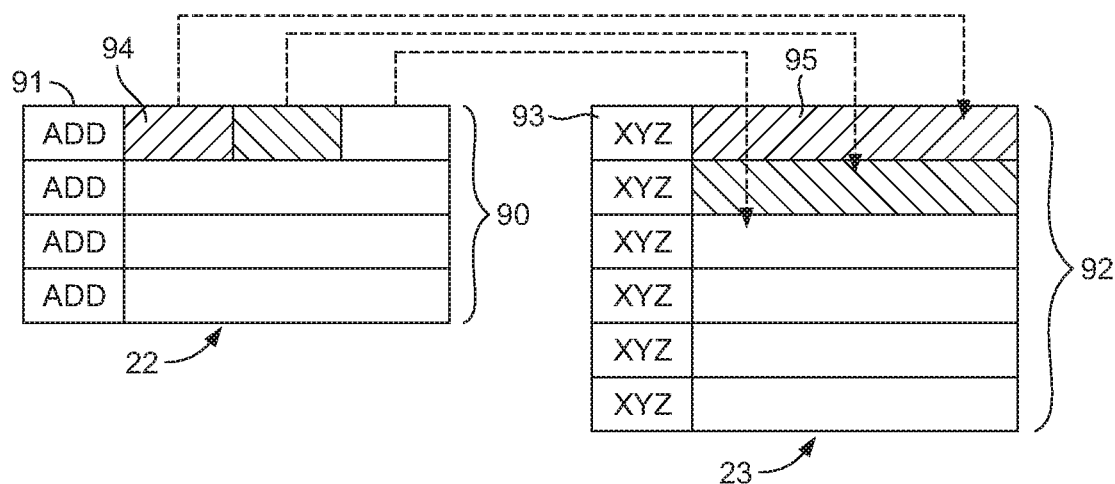
FIG. 9 shows a first embodiment of the operation of the texture cache system of the embodiment of the technology described herein.

FIG. 9 illustrates this operation.

FIG. 9 shows the first, texture data cache 22 having an exemplary set of cache lines 90 each tagged with a respective memory address 91 identifying the location in memory where the data in the cache line is stored. FIG. 9 also shows the second, texel cache 23, again as including a number of cache lines 92, and each tagged with a respective x, y, z position 93 to identify the data that is stored in the cache line.

In the example given in FIG. 9, and as discussed above, the data that is loaded into the first, texture data cache 22 from the memory will be in a compressed form, but will then be decompressed by the data processing unit 24 before it is stored in the second, texel cache 23. Thus, as shown in FIG. 9, a given set of compressed texture data 94 stored in a cache line in the first, texture data cache 22 will be decompressed and stored in a decompressed form 95 in a given cache line of the second, texel cache 23. Thus, as shown in FIG. 9, a set of texture data occupying only part of a line in the first, texture data cache 22, will be decompressed (expanded) so as to occupy an entire cache line in the second, texel cache 23.

In the case of a format conversion operation, the data processing unit 24 could, for example, operate to rearrange the order of bits within a given texel when transferring the data from the first cache 22 to the second cache 23.

In an embodiment, the data processing unit operates also or instead (and in an embodiment also) to rearrange texture data from the way that it is stored in the first cache 22 when storing that data in the second cache 23.

One such example would be in the case of YUV texture data, where the YUV texture data is stored in separate planes (in a multi-plane format) in the memory system 20. In this case, the different data channels of the YUV texture data may be loaded separately into the first cache 22, and stored in respective different cache lines in that cache. The data processing unit 24 could then operate to read respective Y, U and V data values for a given texel of the YUV texture from the different cache lines where those values are stored in the first cache 22, and then store those respective Y, U and V data values for the texel in a respective data word for that texel in a given (the same) cache line in the second (texel) cache 23. In this way, the texture data that is stored in separate planes in the memory system 20 will be grouped by the data processing unit 24 into respective texels in the second cache 23 (as discussed above).

Figure 10:
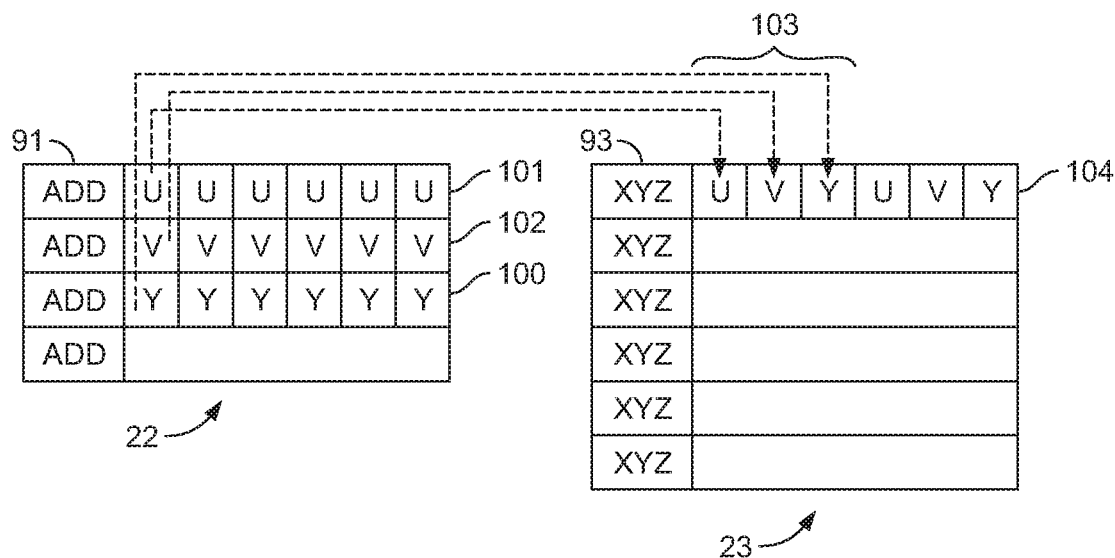
FIG. 10 shows a second embodiment of the operation of the texture cache system of the embodiment of the technology described herein.

FIG. 10 illustrates this, and shows an exemplary set of YUV texture data that has been stored as separate Y, U and V planes in memory, such that the respective Y, U and V data is loaded into different cache lines 100, 101, 102 in the first, texture data cache 22. Respective Y, U and V values for a given position (texel position) in the YUV texture are then transferred from the first cache 22 to the second, texel cache 23, by the data processing unit 24 so as to be stored together as a group 103 in the same cache line 104 of the second, texel cache 23, so as to group the texture data that was stored in separate planes in the memory system 20 into respective texels in the second cache 23.

In another possible format conversion operation, texture data of different types (representing different data types), such as depth and luminance data, may be stored together in the memory system 20 (such that those different data types would be stored together in a given cache line in the first cache 22), but it may be that those different data types would be needed and handled differently (e.g. at different times) by the texture mapper 14. In this case, the data processing unit 24 could operate so as to, in effect, separate the different data types when they are stored in the second cache 23, e.g., so as to store plural data values of one type (e.g. depth data) in one cache line of the second cache 23, and store the data values of the other type (e.g. luminance values) in a different cache line of the second cache 23.

Figure 11:
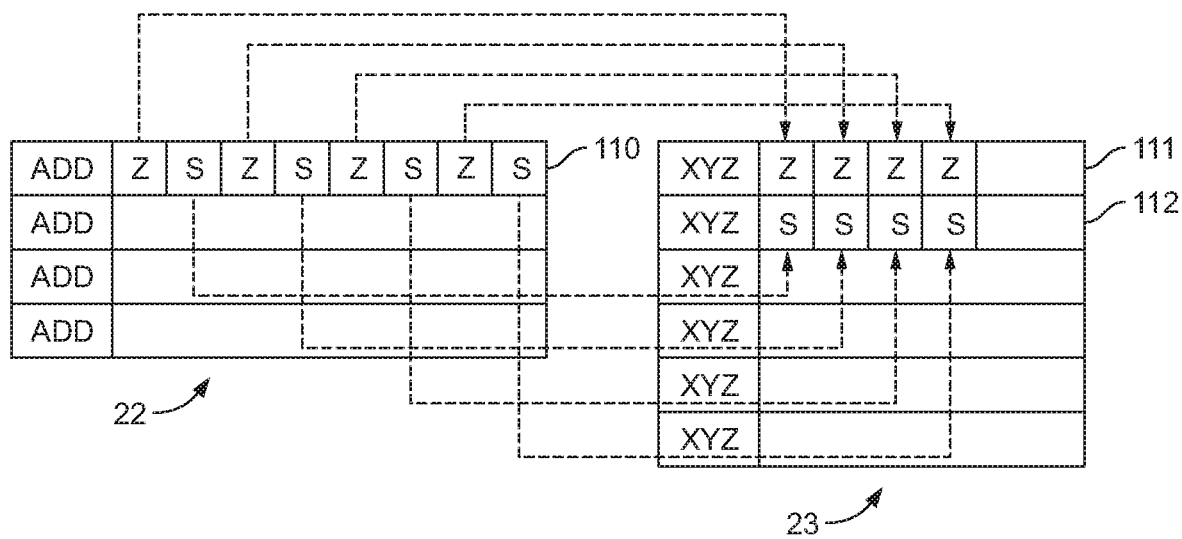
FIG. 11 shows a third embodiment of the operation of the texture cache system in the embodiment of the technology described herein.

FIG. 11 illustrates this operation and shows depth (z) and stencil (s) texture data that is stored in a composite format in the memory being stored in that composite format in a line 110 of the first, texture data cache 23, but the data processing unit 24 then operating to store the depth (z) and stencil (s) texture data from the first cache 22 separately (in separate cache lines) 111, 112 in the second, texel cache 23.

(It will be appreciated that in FIGS. 9, 10 and 11 only a limited number of data entries in the caches are shown for clarity purposes. In general, data will be stored in each cache line of each of the caches.)

In order to facilitate the above operations, the data processing unit 24 is able to perform "unaligned" reads of texture data from the first cache 22 (i.e. the data processing unit can read amounts of data from the first cache in units other than a whole cache line (that do not correspond to an entire cache line) of the first cache), and is able to perform "unaligned" writes of texture data to the second cache 23 (i.e. the data processing unit can write amounts of data to the second cache in units other than a whole cache line (that do not correspond to an entire cache line) of the second cache). (For example, if a cache line in the first cache always contains 64 bytes worth of data starting at a memory address that is divisible by 64, reads from the first cache can start at an address that is not divisible (exactly) by 64 and can have a length which is not 64 bytes, etc.)

In the present embodiment, the data processing unit 24 can read data from the first cache 22 in units of single bytes, and can write data to the second cache in units of single bytes.

In order to facilitate this operation (and otherwise), the first and/or second caches are configured so as to be modifiable at a suitable level of data subdivision. For example, the caches may be modifiable at the level of a single bit or a single byte. In an embodiment, the caches are modifiable in units of four bits.

This may be achieved as desired, for example, by utilising bit-strobes for the cache reads and writes. For example, bit-enables may be set for the desired data positions in a cache line when writing data in the cache line (and correspondingly for reads). For example, each write operation may write 128-bits aligned to a 128-bit boundary, but have an associated 32 bit write mask indicating which 4-bit nibbles (chunks) of the data in the cache should actually be modified (e.g. bit "0" of the mask indicates if bits 0-3 of the data should be written, and so on).

Although, as discussed above, in this embodiment "unaligned" reads can be performed from the first cache, in the present embodiment, the cache system 21 still operates to perform aligned reads (only) to the main memory for texture data. In other words, the fetching of texture data from the main memory 20 is performed by fetching an entire cache line (e.g. into the first cache 22).

As shown in FIG. 2, in the present embodiment it is also possible to bypass 27 the storing of the texture data in the first cache 22. In this case, the texture data is stored in the second cache 23 from the memory system 20 (via the data processing unit 24). This may be appropriate where the texture data is stored in the memory system 20 in the form that it is desired to be used and needed for use by the graphics processing unit 10, such that intermediate storage of the texture data in the first cache 22 is unnecessary.

Figure 16:
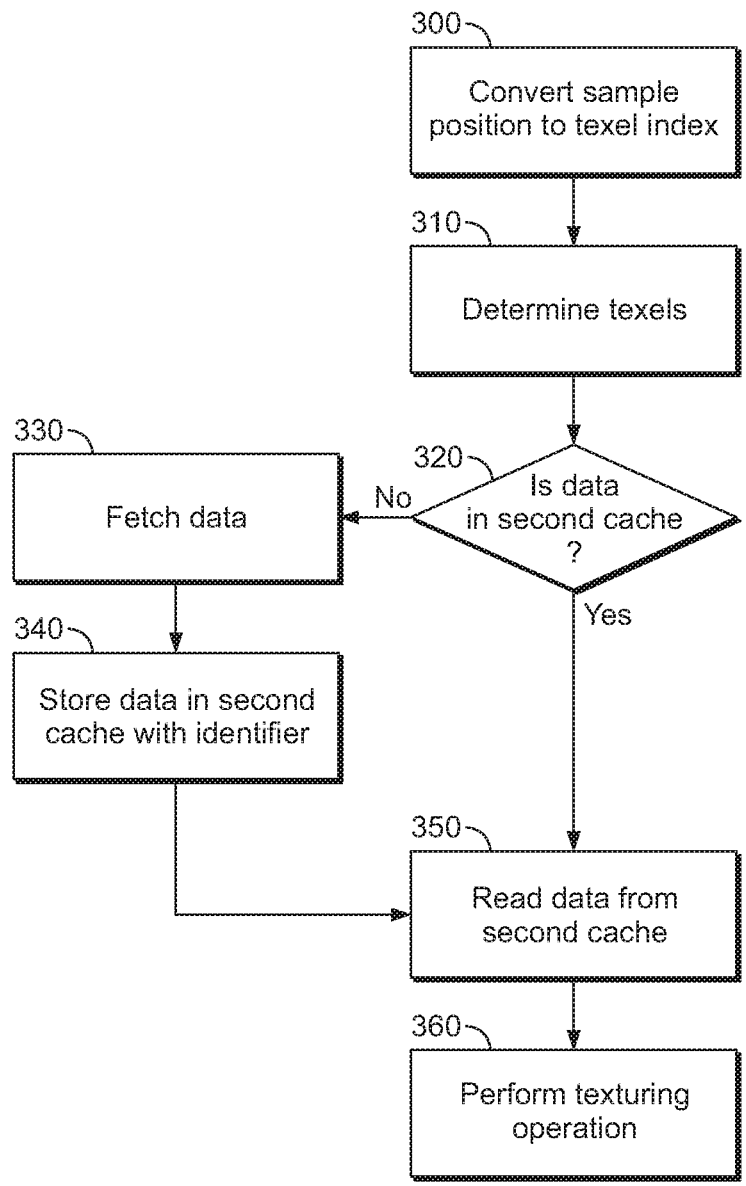
FIG. 16 is a flowchart showing the operation in an embodiment of the technology described herein.

FIG. 16 is a flow diagram illustrating the main steps of a method according to an embodiment of the technology described herein when performing bilinear filtering of texture data in the texture mapper 14.

The method illustrated in FIG. 16 is performed by components of the texture mapper 14 as described below.

At step 300, upon receiving instructions from the shader core 12 for rendering a sampling position in a graphics texture to be rendered (and after the input parameter fetching unit 15 has fetched the input parameters as described above), the coordinate computation unit 16 converts the sampling position in question into the texel indices of a closest (e.g. above left) texel to the sampling position. (In order to read texture data from the second cache 23, the texture mapper 14 addresses the second cache 23 using a position for the texture that is indicative of the texture data that is required, namely the texel indices for the texel(s) required. Thus, at step 300, the position in the texture to be sampled is converted into the texel indices of a closest (above left) texel to the sampling position. This can be done in any suitable and desired manner.)

Then, at step 310, the coordinate computation unit 16 determines the other three closest (above right, bottom left and bottom right) texels to the sampling position such that the four closest texels surrounding the sampling position are determined (as bilinear interpolation is being performed).

At step 320, the texture cache lookup unit 17 checks whether the texture data for the texels corresponding to the determined four closest texels surrounding the sampling position is already stored in the second (texel) cache 23.

This is done by checking the cache line tags (identifiers) to see which of these corresponds to a region (chunk) of the texture that will comprise a block of texels containing one or more of the texels in question. (As discussed above, the second cache line tags identify (using position indices) regions of the texture (blocks of texels) of a predefined size and shape.)

In some cases, all of the required texels will come from a single texture region (block of texels) (and will therefore all be stored in a single cache line). In other cases, the required texels may come from two or four different texture regions (chunks) (blocks of texels) (and will therefore be stored in two or four different cache lines).

If no cache line is found with a tag corresponding to a block containing one (or more) of the required texels, then the texture cache lookup unit 17 determines that that texture data (the texture data for that texel, or the block containing that texel) is not yet stored in the second cache 23.

If the required texture data is not already stored in the second cache 23, the fetching of the required texture data into the second (texel) cache 23 is triggered (step 330), and the fetched texture data is stored in the second (texel) cache (step 340). This will be described in more detail below.

The texture cache lookup unit 17 then reads the required texture data from the second cache (step 350).

(If the required texture data is already present in the second cache 23, steps 330 and 340 are omitted and the texture mapper 14 moves straight to step 350.)

The texture filtering unit 18 then performs bilinear interpolation of the relevant texture data read from the second cache 23 to determine texture data values for the sampling position in question (step 360). The determined values for the sample position in question are then returned to the shader core 12 for use in generating the render target (e.g. shading the fragment in question), for output to the render target 13.

FIGS. 12-15 show in more detail the reading of texture data from the second (texel) cache 23 by the texture mapper 14 and the mechanism for loading data into the first 22 and second 23 caches of the cache system 21 from the memory system 20 in the present embodiment.

FIG. 12 shows the operation when the texture mapper 14 attempts to read data from the second (texel) cache 23 that it requires for a texturing operation (step 120).

As shown in FIG. 12, if the texture data that is required is already present in the second (texel) 23 (there is a hit in the second (texel) cache) (step 121), then a reference count for the cache line containing the required texture data in the second (texel) cache 23 is incremented (step 126) (so as to ensure that that data remains in the second (texel) cache 23 until it has been used for the texture operation in question).

(As shown in FIG. 12, the cache line reference count incrementing process includes a step of checking whether the reference count has been saturated (reached a maximum permitted value) (step 127), and in that case the execution thread that requires the texturing operation is stalled for one cycle (step 128) and will then return to try to "acquire" use of the cache line again at step 126. This will be continued until the thread (texturing operation) in question is able to increment the reference count for the cache line in question.)

As shown in FIG. 12, if and when the relevant cache line's reference count is able to be incremented for a texturing operation (thread) that requires data in that cache line, then the texturing operation (the execution thread that is performing the texturing operation) is added to a "parking buffer" which keeps track of and records execution threads (texturing operations) that are to be performed and for which the required texture data is or is going to be present and available in the second (texel) cache 23 (step 129).

On the other hand, if there is a miss in the second (texel) cache 23 at step 121 when the texture data is attempted to be read from the second (texel) cache 23 (i.e. the required texture data is not present in the second (texel) cache 23), then the relevant data needs to be loaded into the second (texel) cache 23 before the texturing operation can proceed. In this case therefore, as shown in FIG. 12, the first step is to then allocate a cache line in the second (texel) cache 23 for storing the required texture data (step 122).

This allocation process can use any suitable and desired cache line allocation process, such as a least recently used process.

As shown in FIG. 12, if there is no cache line available to be allocated for the new texture data, then the texturing operation (the execution thread) in question is stalled for one cycle and the allocation process is retried (steps 123 and 124). This will be repeated until a cache line can be allocated in the second (texel) cache 23 for the texture data in question.

Once a cache line has been allocated for the required texture data, then the state of the cache line is set to indicate that it has been allocated (step 125), and the reference count for that cache line is incremented (step 126). The texturing operation (execution thread) in question is then again added to the parking buffer that records the texturing operations (execution threads) that are ready to use data from the second (texel) cache 23 (step 129).

Figure 13A:
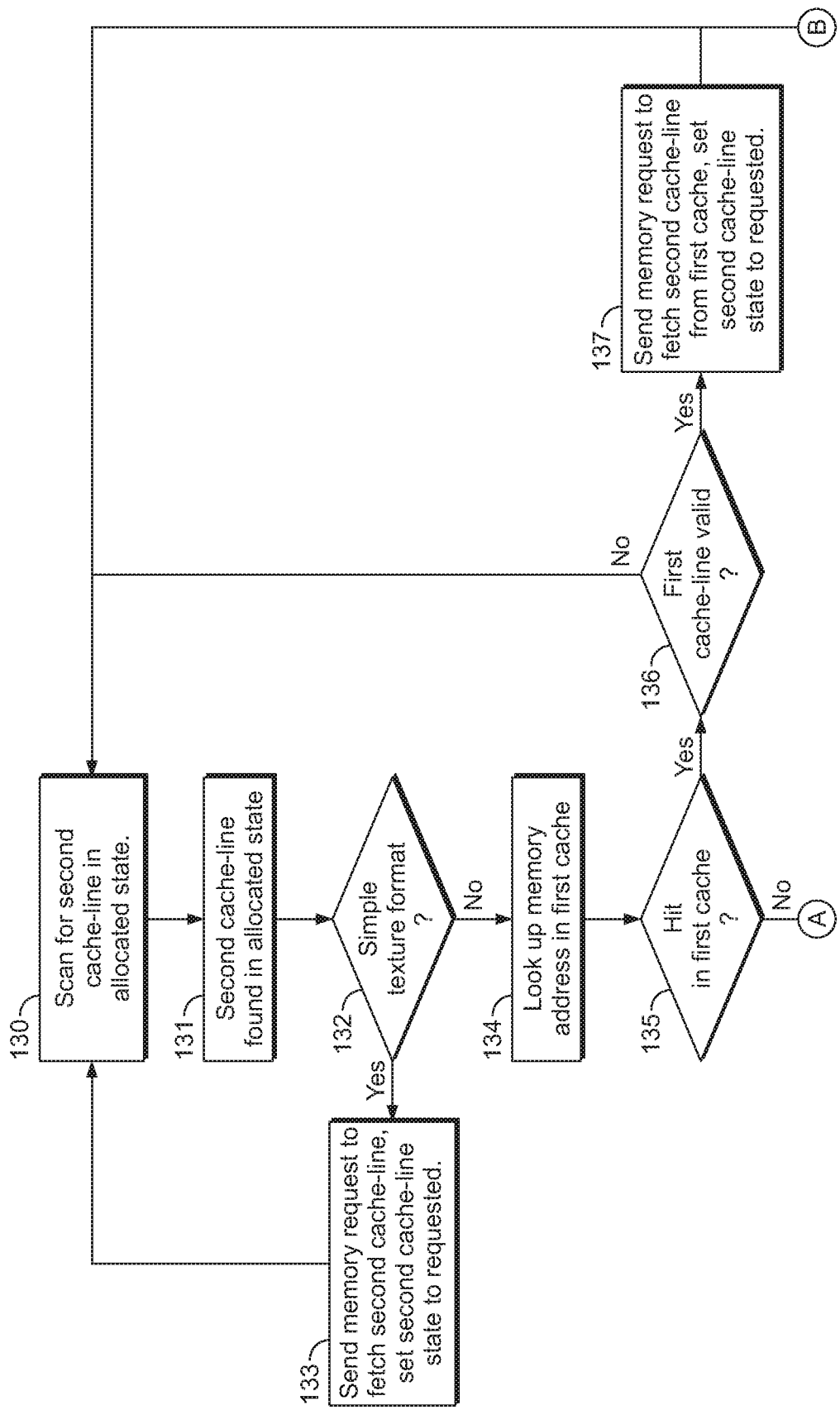
FIGS. 13a and 13b are flowcharts showing the fetching of data into the cache system in an embodiment of the technology described herein.
Figure 13B:
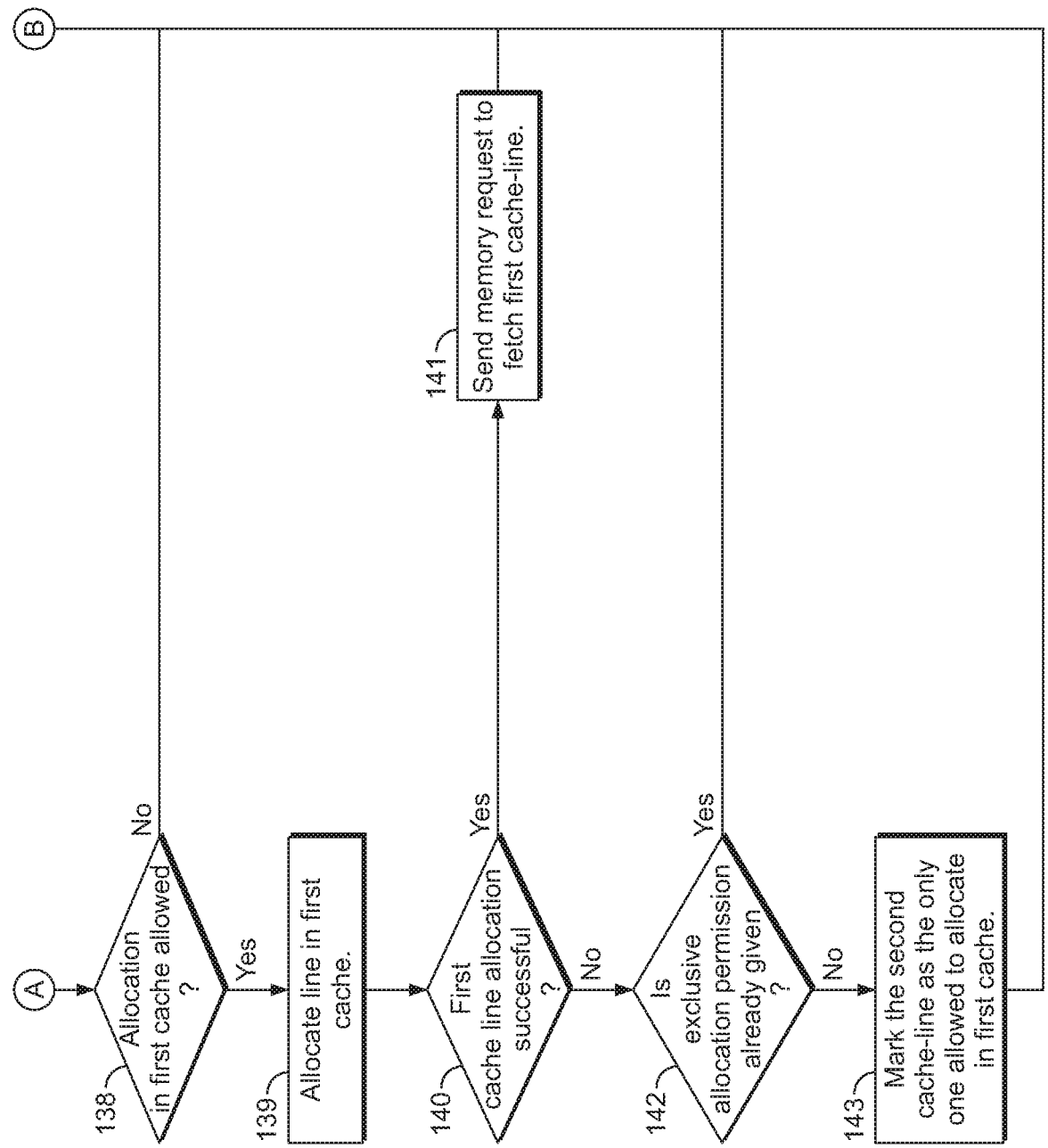

FIGS. 13a and 13b show the operation in the present embodiment for loading data into the second (texel) cache.

As shown in FIGS. 13a and 13b, the process operates by scanning the second cache to identify a cache line that has been set to an "allocated" state (i.e. that is awaiting data and which has been allocated to receive that data) (step 130).

If a cache line in the second cache 23 in an allocated state is found (step 131), it is then determined whether the data for that cache line will be in a "simple" texture format or not (step 132). The "simple" texture format in this embodiment indicates that the data can be used essentially in the form that it is stored in in the memory system 20, and so does not need to be transferred to the second cache 23 via the first cache 22 of the cache system 21.

Thus, as shown in FIGS. 13a and 13b, if it is determined that the required texture data will have the "simple" texture format, a memory request is sent to the memory system 20 to fetch the data for the second cache line in question (and the cache line in the second cache is set to the state "requested") (step 133). The process then returns to scan for another cache line in the second cache 23 that is in the allocated state.

On the other hand, if it is determined at step 132 that the required texture data is not the "simple" texture format, then it is necessary for the required texture data to first be loaded into the first "texture data" cache 22, before being transferred to the second (texel) cache 23. In that case therefore, it is first determined whether the texture data is already present or being loaded in the first cache 22 (step 134).

If there is a hit in the first cache (i.e. there is a cache line allocated for that texture data in the first cache) (step 135), it is then determined whether the allocated cache line in the first cache 22 for that texture data is valid (contains valid data) (step 136). If so, a memory request is sent to fetch the data for the allocated cache line in the second cache 22 from the cache line in first cache 22 where that data is stored (and the cache line in the second cache 23 is set to the state "requested") (step 137).

The process then returns to scan for another "allocated" line in the second cache (which is also done if it is determined at step 136 that the cache line in the first cache is not yet valid (i.e. has been allocated to store the required data but that data is not validly present in the cache line yet)).

If there is a miss in the first cache at step 135 (i.e. there is no allocated line in the first cache 22 for the required data), the operation then proceeds to try to allocate a line in the first cache for the required data. As shown in FIGS. 13a and 13b, this allocation process comprises first determining whether allocation of cache lines in the first cache is currently allowed (step 138). If not, the process returns to scan for another "allocated" cache line in the second cache.

If the allocation of cache lines in the first cache is allowed, then it is attempted to allocate a line in the first cache 22 for the data in question (step 139). If that allocation is successful (step 140), then a memory request is sent to the memory system 20 to fetch and store the required data in the allocated cache line in the first cache (step 141). The process again then returns to scan for another "allocated" line in the second cache.

On the other hand, if the cache line allocation in the first cache 22 is unsuccessful at step 140, it is then determined whether exclusive allocation permission for cache lines in the first cache has already been given to another cache line of the second cache 23 that is already awaiting the fetching of data into the first cache (step 142). If so, then the process returns to scan for another cache line in the second cache in the allocated state.

On the other hand, if exclusive allocation permission has not already been given, then the cache line in the second cache in question is marked as having the exclusive right to allocate cache lines in the first cache, such that that cache line will be able to be allocated the next cache line that becomes free in the first cache (step 143). The process then returns again to look for a cache line in the second cache that is in an allocated state (step 130).

As discussed above, in order to fetch the required texture data from the memory 20, the texture sample index position is converted to the appropriate memory address(es) where the texture data for that texture position is stored in the memory 20. The texture position is converted to a memory address (or to two or more memory addresses) by using a look-up table and/or by applying one or more predefined rules or formulae for such a conversion.

Once the memory address(es) for the required texture data has(have) been determined, a request is sent to that (those) memory address(es) of the memory 20, and the texture data from that (those) memory address(es) is fetched.

These memory requests are sent to the memory 20 which will perform the reads. As described above, the responses for the reads can return in any order from the memory 20. The first texture (data) cache 22 therefore keeps track of what data has returned from the memory 20 and only sets the cache line state to "VALID" after all the responses to the memory requests have returned and all the needed data for each response has been written into the first cache 22. This is done with a request counter for each cache line. The request counter is initialized to a value equal to the number of memory requests sent for the cache line in question. For each response that has been written into the cache line in question, the request counter is decremented by one. Once it reaches zero the cache line state is set to "VALID".

Figure 14A:
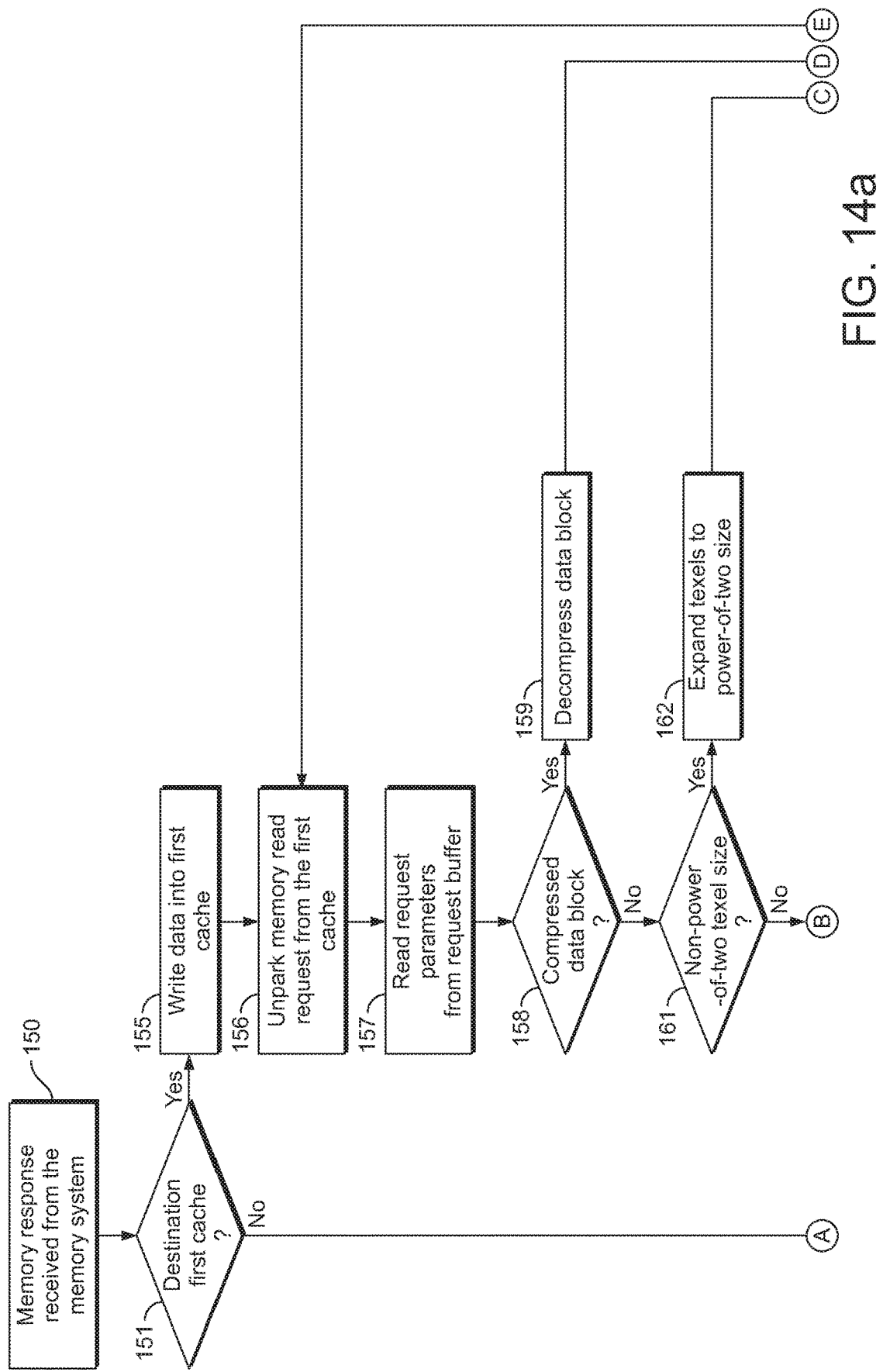

FIGS. 14*a* and 14*b* show the operation to transfer data to the second (texel) cache when a memory response containing the texture data is received from the memory system 20 (step 150).

As shown in FIGS. 14*a* and 14*b*, it is first determined whether the destination for the texture data is the first (texture data) cache 22 or not (step 151).

If not (i.e. the texture data is to be provided directly to the second (texel) cache 23 bypassing the first cache 22), then as shown in FIGS. 14*a* and 14*b*, the texture data for the texels are arranged in Morton or linear order by the data processing unit 24 (step 152), and the texture data is appropriately written by the data processing unit into the second (texel) cache 23 (steps 153 and 154).

On the other hand, as shown in FIGS. 14*a* and 14*b*, if the destination of the texture data returned from the memory system 20 is the first (texture data) cache 22, then that data is written directly into the first cache (in the allocated cache line in the first cache) in the form that it is received from the memory system 20 (step 155). The corresponding memory read request for the first cache will then be unparked (step 156) and the relevant read request parameters read (step 157).

The texture data loaded into the first (texture data) cache 22 is then appropriately processed by the data processing unit 24 and written into the second (texel) cache by use by the texture mapper 14.

Thus, as shown in FIGS. 14*a* and 14*b*, it is determined whether the texture data loaded from the memory system is in a compressed form (step 158), and if so, the data processing unit 24 will operate to decompress the compressed texture data (step 159) and then store the texture data in the decompressed form in the second cache 23 (steps 160, 153 and 154).

Correspondingly, if the texture data loaded from the memory system is determined to be a non-power-of-two texel size (step 161) then the data processing unit 24 will operate to expand the texels to a power-of-two size (step 162), and store the so-expanded texture data in the second (texel) cache 23 (steps 160, 153 and 154).

If the texture data received from the memory system 20 is in a luminance alpha-format (step 163), then the data processing unit 24 will operate to expand that texture data to an RGBA format (step 164) and store the so-expanded texels in the second cache 23 (steps 160, 153 and 154).

If the texture data received from the memory system 20 is depth/stencil data (step 165), then it will be determined whether the depth data is to be fetched (step 166). If so, the data processing unit 24 will operate to discard the stencil values and pack the depth values appropriately (step 167), or if depth values are not required, the data processing unit 24 will operate to discard the depth values and replicate the stencil values to an RG format and pack them accordingly (step 168). The so-processed texture data will then be stored in the second cache 23 (steps 160, 153 and 154).

If the texture data is in a YUV format, the data processing unit will process that data in a desired manner (e.g., as discussed above, to arrange the YUV data into appropriate YUV texels) (step 169), and store that data in the second cache 23 (steps 160, 153 and 154).

As shown in FIGS. 14*a* and 14*b*, once one memory response has been appropriately processed, it is then determined whether any further memory read requests are waiting for that response (step 170). If so, the processing returns to step 156 to unpark the next memory read request that is waiting for that response, so as to service that memory read request. If not, the handling for that memory response is completed (step 170) and the process will resume (when the next set of texture data is received from the memory system 20).

In the present embodiment, a cache line in the first cache 22 is only indicated as being "valid" (i.e. that all of the required texture data is stored in the cache line and therefore available for use) once all of the memory requests for the cache line have been returned.

In order to determine when all of the memory requests have returned, a "valid counter" is provided which counts down from the total number of requests as each memory request is returned, and when all of the memory requests have returned the valid counter is equal to zero and this indicates that the cache line is "valid" (i.e. the texture data is available for use). When the memory requests are first sent, the valid counter is set to equal the number of memory requests sent to fill the cache line. The valid counter then counts down by 1 each time a memory request is returned. Thus, when the valid counter reaches zero, this indicates that all of the memory requests have returned and the cache line is valid (the texture data is available for use).

Figure 15:
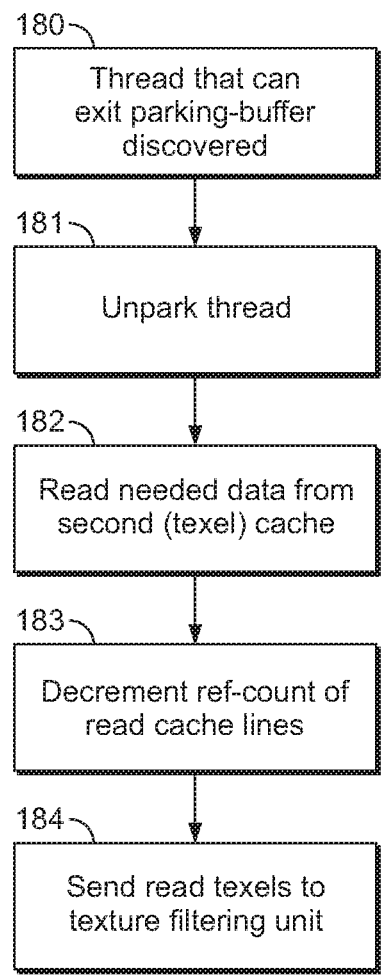
FIG. 15 is a flowchart showing the use of texture data from the second cache of the cache system in an embodiment of the technology described herein.

FIG. 15 shows the operation of releasing texturing operations (execution threads) that have been placed in the parking buffer when the required texture data is present in the second (texel) cache 23.

As shown in FIG. 15, this process comprises identifying a thread (texturing operation) that can be released from the parking buffer (e.g. because the required data is already or is now present in the second (texel) cache 23) (step 180). The texturing operation (thread) that can exit the parking buffer is then "unparked" (step 181), and so issued to the texture mapper 14 for execution (performing). The texture mapper 14 will then read the needed data from the second (texel) cache 23 (step 182). (This will be possible because that texture data will be present in the second (texel) cache 23 at this stage in the process.)

The reference count for the cache line or lines in the second (texel) cache 23 from which the data was read for the texturing operation is accordingly decremented (step 183).

The texture data read from the second (texel) cache 23 is then sent to the texture filtering unit 18 so that the relevant texturing operation can be performed using that data (step 184).

It can be seen from the above that the technology described herein, in its embodiments at least, can provide a more efficient mechanism for using textures in a graphics processing system and unit. This is achieved, in the embodiments of the technology described herein at least, by transferring texture data from memory to the graphics processing unit that is to use that data using a two-level (a two-stage) cache system that includes a data processing unit able to process the texture data.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A graphics processing system comprising:
a memory system;
a graphics processing unit; and
a cache system arranged between the memory system and the graphics processing unit and operable to transfer texture data stored in the memory system to the graphics processing unit for use by the graphics processing unit when generating a render output;
the cache system comprising:
a first cache operable to receive texture data from the memory system and operable to accept unaligned reads;
a second cache operable to receive texture data from the first cache and to provide texture data to the graphics processing unit for use when generating a render output; and
a data processing unit intermediate the first cache and the second cache and operable to process data stored in the first cache and to store the processed data in the second cache for use by the graphics processing unit when generating a render output;
wherein the cache system is operable to perform an aligned read operation from the memory system in order to provide texture data to the first cache,
wherein the data processing unit is operable to decompress texture data that is stored in a compressed form in the first cache and to then store the decompressed texture data in the second cache; and
wherein the data processing unit is able to perform an unaligned read operation from the first cache in order to provide texture data to the second cache.

2. The system of claim 1, wherein the second cache is larger than the first cache.

3. The system of claim 1, wherein the texture data is stored in the first cache of the cache system in the form that it is stored in the memory system, and is identified in the first cache using an identifier that is indicative of the memory address where the texture data is stored.

4. The system of claim 1, wherein the texture data is stored in the second cache as respective texture data elements, and the texture data that is stored in the second cache is identified in the second cache using an identifier that is indicative of a position in a graphics texture associated with the texture data.

5. The system of claim 1, wherein the data processing unit is operable to read data stored in the first cache and to store the read data in the second cache in a different arrangement to the way that that data was stored in the first cache.

6. The system of claim 1, wherein the data processing unit is operable to: reorder texture data elements in a given cache line; distribute texture data elements over plural cache lines in the second cache where they are stored in a single cache line in the first cache; and/or store texture data elements that are stored in different cache lines in the first cache in the same cache line in the second cache.

7. The system of claim 1, wherein the cache system is further operable so as to be able to store texture data from the memory system in the second cache without first storing the texture data in the first cache.

8. A cache system for use in a graphics processing system that comprises a memory system and a graphics processing unit;
the cache system comprising:
a first cache operable to receive texture data from a memory system and operable to accept unaligned reads;
a second cache operable to receive texture data from the first cache and to provide texture data to a graphics processing unit for use when generating a render output; and
a data processing unit intermediate the first cache and the second cache and operable to process data stored in the first cache and to store the processed data in the second cache for use by the graphics processing unit when generating a render output;
wherein the cache system is operable to perform an aligned read operation from the memory system in order to provide texture data to the first cache,
wherein the data processing unit is operable to decompress texture data that is stored in a compressed form in the first cache and to then store the decompressed texture data in the second cache; and wherein the data processing unit is able to perform an unaligned read operation from the first cache in order to provide texture data to the second cache.

9. A method of operating a graphics processing system, the graphics processing system comprising:
a memory system;
a graphics processing unit; and
a cache system arranged between the memory system and the graphics processing unit and operable to transfer texture data stored in the memory system to the graphics processing unit for use by the graphics processing unit when generating a render output;
the cache system comprising:
a first cache operable to receive texture data from the memory system and operable to accept unaligned reads;
a second cache operable to receive texture data from the first cache and to provide texture data to the graphics processing unit for use when generating a render output; and
a data processing unit intermediate the first cache and the second cache and operable to process data stored in the first cache and to store the processed data in the second cache for use by the graphics processing unit when generating a render output;
wherein the cache system is operable to perform an aligned read operation from the memory system in order to provide texture data to the first cache,
wherein the data processing unit is operable to decompress texture data that is stored in a compressed form in the first cache and to then store the decompressed texture data in the second cache; and
wherein the data processing unit is able to perform an unaligned read operation from the first cache in order to provide texture data to the second cache;
the method comprising:
performing an aligned read operation in order to load texture data from the memory system into the first cache of the cache system;
the data processing unit processing the texture data loaded into the first cache and storing the processed data in the second cache; and
the graphics processing unit using the processed texture data stored in the second cache to perform a texturing operation;
wherein the method further comprises:
loading compressed texture data from the memory system into the first cache of the cache system; and
the data processing unit:
performing an unaligned read operation to read compressed texture data from the first cache, decompressing the compressed texture data read from the first cache, and storing the decompressed texture data in a cache line of the second cache.

10. The method of claim 9, wherein the second cache is larger than the first cache.

11. The method of claim 9, wherein the texture data is stored in the first cache of the cache system in the form that it is stored in the memory system, and is identified in the first cache using an identifier that is indicative of the memory address where the texture data is stored.

12. The method of claim 9, wherein the texture data is stored in the second cache as texture data elements, and the texture data that is stored in the second cache is identified in the second cache using an identifier that is indicative of a position in a graphics texture associated with the texture data.

13. The method of claim 9 comprising:
loading texture data from the memory system into the first cache so as to be stored in a first arrangement in the first cache; and
the data processing unit:
reading the data from the first cache and storing the data in the second cache in a different arrangement to the first arrangement.

14. The method of claim 9, comprising the data processing unit:
reordering texture data elements in a given cache line;
distributing texture data elements over plural cache lines in the second cache where they are stored in a single cache line in the first cache; and/or
storing texture data elements that are stored in different cache lines in the first cache in the same cache line in the second cache.

15. The method of claim 9, comprising storing texture data from the memory system in the second cache without first storing the texture data in the first cache.

16. A non-transitory computer readable storage medium storing computer software code which when executing on a data processor performs a method of operating a graphics processing system, the graphics processing system comprising:
a memory system;
a graphics processing unit; and
a cache system arranged between the memory system and the graphics processing unit and operable to transfer texture data stored in the memory system to the graphics processing unit for use by the graphics processing unit when generating a render output;
the cache system comprising:
a first cache operable to receive texture data from the memory system and operable to accept unaligned reads;
a second cache operable to receive texture data from the first cache and to provide texture data to the graphics processing unit for use when generating a render output; and
a data processing unit intermediate the first cache and the second cache and operable to process data stored in the first cache and to store the processed data in the second cache for use by the graphics processing unit when generating a render output;
wherein the cache system is operable to perform an aligned read operation from the memory system in order to provide texture data to the first cache,
wherein the data processing unit is operable to decompress texture data that is stored in a compressed form in the first cache and to then store the decompressed texture data in the second cache; and
wherein the data processing unit is able to perform an unaligned read operation from the first cache;
the method comprising:
performing an aligned read operation in order to load texture data from the memory system into the first cache of the cache system;
the data processing unit processing the texture data loaded into the first cache and storing the processed data in the second cache; and
the graphics processing unit using the processed texture data stored in the second cache to perform a texturing operation;
wherein the method further comprises:
loading compressed texture data from the memory system into the first cache of the cache system; and the data processing unit:
performing an unaligned read operation to read compressed texture data from the first cache, decompressing the compressed texture data read from the first cache, and storing the decompressed texture data in a cache line of the second cache.

\* \* \* \* \*